United States Patent
Zhu et al.

(10) Patent No.: US 12,423,368 B2
(45) Date of Patent: Sep. 23, 2025

(54) RECOMMENDATION METHOD AND APPARATUS, TRAINING METHOD AND APPARATUS, DEVICE, AND RECOMMENDATION SYSTEM

(71) Applicant: HUAWEI TECHNOLOGIES CO., LTD., Guangdong (CN)

(72) Inventors: Jieming Zhu, Shenzhen (CN); Zhou Zhao, Hangzhou (CN); Shengyu Zhang, Hangzhou (CN); Xiuqiang He, Shenzhen (CN); Li Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/441,389

(22) Filed: Feb. 14, 2024

(65) Prior Publication Data

US 2024/0184837 A1 Jun. 6, 2024

Related U.S. Application Data

(63) Continuation of application No. PCT/CN2022/105075, filed on Jul. 12, 2022.

(30) Foreign Application Priority Data

Aug. 20, 2021 (CN) .......................... 202110963660.X

(51) Int. Cl.
*G06F 16/9535* (2019.01)
*G06V 10/40* (2022.01)

(52) U.S. Cl.
CPC .......... *G06F 16/9535* (2019.01); *G06V 10/40* (2022.01)

(58) Field of Classification Search
CPC .. G06F 16/9535; G06F 16/535; G06F 16/583; G06V 10/40; G06N 3/02; G06N 3/045; G06N 3/08
See application file for complete search history.

(56) References Cited

U.S. PATENT DOCUMENTS 7,991,715 B2 * 8/2011 Schiff ................ G06Q 30/0273
706/45
9,432,421 B1   8/2016 Mott et al.
(Continued)

FOREIGN PATENT DOCUMENTS

CN    102831234 A    12/2012
CN    108415996 A    8/2018
(Continued)

OTHER PUBLICATIONS

International Search Report and Written Opinion in International Appln. No. PCT/CN2022/105075, mailed on Oct. 10, 2022, 17 pages (with English translation).
(Continued)

*Primary Examiner* — Debbie M Le
(74) *Attorney, Agent, or Firm* — Fish & Richardson P.C.

(57) ABSTRACT

Examples of recommendation methods and apparatus are described. In one example method, a plurality of images are obtained, where each image includes one candidate interface and one type of candidate content presented by using the candidate interface. Image feature data of each image is obtained, and input for a prediction model is determined based on user feature data of a target user and the image feature data. Then, a degree of preference of the target user for each image is predicted by using the prediction model. At least one of a candidate interface or candidate content that are included in the plurality of images is selected based on the degree of preference. Recommendation is then per-
(Continued)

formed to the user based on the selected candidate content or candidate interface.

18 Claims, 18 Drawing Sheets

(56) References Cited

U.S. PATENT DOCUMENTS

| | | | | |
|---|---|---|---|---|
| 9,858,295 | B2* | 1/2018 | Murphy-Chutorian | ..................... G06F 16/5838 |
| 10,417,277 | B2* | 9/2019 | Murphy-Chutorian | ..................... G06Q 10/00 |
| 11,151,196 | B2* | 10/2021 | Kußmaul | ............ G06F 16/9538 |
| 11,281,844 | B2* | 3/2022 | Smith | ................... G06F 3/0483 |
| 11,307,749 | B1* | 4/2022 | Comer | ................ G06F 3/04845 |
| 11,709,996 | B2* | 7/2023 | Kannan | .................... G06N 3/08 706/11 |
| 11,750,866 | B2* | 9/2023 | Punja | ............... H04N 21/25891 725/34 |
| 11,783,199 | B2* | 10/2023 | Chen | ...................... G06N 3/088 382/159 |
| 2016/0055541 | A1 | 2/2016 | Calistri-Yeh | |
| 2019/0220694 | A1 | 7/2019 | Biswas et al. | |
| 2020/0008227 | A1* | 1/2020 | Lee | .................. H04W 28/0278 |
| 2022/0222920 | A1* | 7/2022 | Huang | ................... G06V 10/76 |

FOREIGN PATENT DOCUMENTS

| | | | |
|---|---|---|---|
| CN | 109740068 | A | 5/2019 |
| CN | 109947510 | A | 6/2019 |
| CN | 110457588 | A | 11/2019 |
| CN | 110737783 | A | 1/2020 |
| CN | 111651692 | A | 9/2020 |
| CN | 112100504 | A | 12/2020 |
| CN | 113806631 | A | 12/2021 |
| CN | 110955821 | B | 5/2024 |
| WO | 2018000585 | A1 | 1/2018 |

OTHER PUBLICATIONS

Wu et al., "Neural News Recommendation with Multi-Head Self-Attention," Proceedings of the 2019 Conference on Empirical Methods in Natural Language Processing and the 9th International Joint Conference on Natural Language Processing, Nov. 3-7, 2019, pp. 6389-6394.

Wang et al., "Fine-grained Interest Matching for Neural News Recommendation," Proceedings of the 58th Annual Meeting of the Association for Computational Linguistics, Jul. 5-10, 2020, pp. 836-845.

Ge et al., "Image Matters: Visually modeling user behaviors using Advanced Model Server," CoRR, submitted on Sep. 4, 2018, arXiv:1711.06505v3, 9 pages.

Wu et al., "Explainable Social Contextual Image Recommendation with Hierarchical Attention," CoRR, submitted on Jul. 10, 2018, arXiv:1806.00723v2, 14 pages.

Extended European Search Report in European Appln. No. 22857473.7, mailed on Sep. 17, 2024, 10 pages.

* cited by examiner

RECOMMENDATION METHOD AND APPARATUS, TRAINING METHOD AND APPARATUS, DEVICE, AND RECOMMENDATION SYSTEM

CROSS-REFERENCE TO RELATED APPLICATIONS

This application is a continuation of International Application No. PCT/CN2022/105075, filed on Jul. 12, 2022, which claims priority to Chinese Patent Application No. 202110963660.X, filed on Aug. 20, 2021. The disclosures of the aforementioned applications are hereby incorporated by reference in their entireties.

TECHNICAL FIELD

Embodiments of this application relate to the field of recommendation technologies, and in particular, to a recommendation method and apparatus, a training method and apparatus, a device, and a recommendation system.

BACKGROUND

Nowadays, various mobile news applications have changed a conventional manner of reading news by people. Major news platforms continuously generate massive news. Therefore, various types of news content are recommended to a user when the user uses these news applications. If the user is not interested in the recommended news content, a click-through rate of news is reduced. To increase a click-through rate of news, a personalized news recommendation system emerges correspondingly. The system explores a user's point of interest by using a machine learning method, to recommend news content that the user is more interested in, and increase a click-through rate of news.

However, a current news recommendation system only explores news content that a user is interested in, but ignores influence, on the user, of a news interface used for recommending news content. Consequently, a click-through rate of news cannot be further increased.

SUMMARY

Embodiments of this application provide a recommendation method and apparatus, a training method and apparatus, a device, and a recommendation system, to increase, based on influence of a news interface on users, a rate of clicking/tapping news by users.

According to a first aspect, an embodiment of this application provides a recommendation method. The method includes: obtaining a plurality of images, where each image includes one candidate interface and one type of candidate content presented by using the candidate interface, the image may be understood as an image in which candidate content is presented by using a candidate interface, the candidate content may be news content or may be other content such as a short video or commodity information, and correspondingly, the candidate interface may be a news interface or may be an interface for presenting a short video or an interface for presenting commodity information; obtaining image feature data of each image, where the image feature data may include global visual impression feature data and/or local visual impression feature data, the global visual impression feature data may be understood as feature data extracted from the entire image, and the local visual impression feature data may be understood as feature data extracted from a local region of the image; predicting, by using a prediction model, a degree of preference of a target user for each image based on user feature data of the target user and the image feature data, where input for the prediction model is determined based on the user feature data and the image feature data, feature data of a user includes age information of the user, a city in which the user is located, and news-related historical data of the user, and the news-related historical data of the user may specifically include a type of news browsed by the user, a type of news clicked/tapped by the user, time at which the user clicks/taps the news, a place at which the user clicks/taps the news, and the like; and selecting, based on the degree of preference, a candidate interface and/or candidate content from candidate interfaces and candidate content that are included in the plurality of images, to perform recommendation. Specifically, based on the degree of preference, only candidate content may be selected from the plurality of images for recommendation, or only a candidate interface may be selected from the plurality of images for recommendation, or both candidate content and a candidate interface may be selected from the plurality of images for recommendation.

An image includes both candidate content and a candidate interface. Therefore, a prediction model obtained through training based on image feature data of the image can accurately predict a degree of preference of a user for the image by considering influence of both the candidate content and the candidate interface on the user, to recommend content that the user is interested in to the user by using a candidate interface that the user is interested in, so as to increase a rate of clicking/tapping recommended content by users.

In an implementation, each image includes a plurality of regions. Specifically, an image may be divided by using a plurality of methods to obtain a plurality of regions. For example, based on the foregoing descriptions, it can be learned that one piece of news may include a news title, a news author, a news category, and other parts. In addition, the news may further include a picture part. Therefore, region coordinates of the foregoing parts may be obtained based on news typesetting. Then the image is divided into the plurality of regions based on the region coordinates. The image feature data of each image includes a plurality of local eigenvectors, and each local eigenvector represents one region.

In this implementation, an image is divided into a plurality of regions, and a local eigenvector representing each region is used as image feature data of the image, so that a local feature of the image can be well extracted, to improve accuracy of prediction for a degree of preference of a user for an image.

In an implementation, the predicting, by using a prediction model, a degree of preference of a target user for each image based on user feature data of the target user and the image feature data includes: for each image, obtaining N word vectors based on the candidate content in the image, where each word vector represents one word in the candidate content, N is a positive integer, the candidate content includes N words, one word vector may be correspondingly generated for each word by using a text characterizer, the text characterizer, similar to a picture characterizer, may also be understood as a model obtained through pre-training, the model may have a plurality of types, for example, the model may be a Bert model, and because a title of news content can well indicate main information of the news content, when the candidate content is news content, word segmentation may be performed on a title of the news content to obtain N words, and then N word vectors representing the N words are obtained by using the text characterizer; for each word vector, calculating, by using a model of an attention mechanism, an attention weight of each of the plurality of local eigenvectors based on the word vector and the plurality of local eigenvectors, where the attention weight indicates a degree to which the target user pays attention to a region represented by the local eigenvector when the target user reads a word represented by each word vector, and the attention mechanism is a mechanism of calculating attention weights of all parts of a neural network model and combining the attention weights into an attention vector to dynamically control, in the neural network model, a degree of attention to all parts or a specific part of the neural network model; performing fusion on each word vector and the plurality of local eigenvectors based on the attention weight of each of the plurality of local eigenvectors to obtain a first fusion eigenvector, where one first fusion eigenvector is correspondingly obtained for each word vector, and specifically, weighting may be performed on the plurality of local eigenvectors by using the attention weight of each of the plurality of local eigenvectors, and then a weighting result is added to the word vector to obtain the first fusion eigenvector; and predicting, by using the prediction model, the degree of preference of the target user for each image based on the user eigenvector and N first fusion eigenvectors corresponding to the N word vectors, where input for the prediction model is determined based on the user eigenvector and the N first fusion eigenvectors, and the user eigenvector represents the user feature data of the target user.

In this implementation, the attention weight of each of the plurality of local eigenvectors is calculated by using the model of the attention mechanism. Because the attention weight indicates a degree to which the target user pays attention to a region represented by the local eigenvector when the target user reads a word represented by each word vector, the first fusion eigenvector obtained by performing fusion on each word vector and the plurality of local eigenvectors based on the attention weight of each of the plurality of local eigenvectors can indicate impression feature information of a word and each region in the image for the user. In this way, a degree of preference is predicted by using the first fusion eigenvector, so that accuracy of prediction for a degree of preference of a user for an image can be improved.

In an implementation, the predicting, by using the prediction model, the degree of preference of the target user for each image based on the user eigenvector and N first fusion eigenvectors corresponding to the N word vectors includes: for each image, processing, by using a model of a self-attention mechanism, the N first fusion eigenvectors corresponding to the N word vectors to obtain N semantic-enhanced eigenvectors, where each first fusion eigenvector corresponds to one semantic-enhanced eigenvector, the self-attention mechanism (self-attention mechanism) is a mechanism obtained by improving the attention mechanism, dependency on external information is reduced in the self-attention mechanism, and therefore the self-attention mechanism is better at capturing an internal correlation of data or a feature; and predicting, by using the prediction model, the degree of preference of the target user for each image based on the user eigenvector and the N semantic-enhanced eigenvectors, where input for the prediction model is determined based on the user eigenvector and the N semantic-enhanced eigenvectors.

The semantic-enhanced eigenvector is obtained by processing, by using the model of the self-attention mechanism, the N first fusion eigenvectors corresponding to the N word vectors. Because the self-attention mechanism is better at capturing an internal correlation of data or a feature, the obtained semantic-enhanced eigenvector can indicate a correlation between first fusion eigenvectors, so that impression feature information of the image for the user can be more accurately indicated. In this way, a degree of preference is predicted by using the semantic-enhanced eigenvector, so that accuracy of prediction for a degree of preference of a user for an image can be improved.

In an implementation, the predicting, by using the prediction model, the degree of preference of the target user for each image based on the user eigenvector and the N semantic-enhanced eigenvectors includes: for each image, performing fusion on the N semantic-enhanced eigenvectors by using a model of an additive attention mechanism to obtain a second fusion eigenvector; and predicting, by using the prediction model, the degree of preference of the target user for each image based on the user eigenvector and the second fusion eigenvector, where input for the prediction model is determined based on the user eigenvector and the second fusion eigenvector.

Fusion is performed on the N semantic-enhanced eigenvectors by using the model of the additive attention mechanism, and a degree of preference is predicted by using the second fusion eigenvector obtained through fusion, so that accuracy of prediction for a degree of preference of a user for an image is improved.

In an implementation, the image feature data of each image includes a global eigenvector, and the global eigenvector represents the image. In this case, the image feature data may also be referred to as global visual impression feature data. A method for obtaining the global eigenvector may specifically include: inputting the image into a picture characterizer, to convert the image into the global eigenvector by using the picture characterizer.

In this implementation, the global eigenvector representing the image is used as the image feature data of the image, so that a global feature of the image can be well extracted, to improve accuracy of prediction for a degree of preference of a user for an image.

In an implementation, the predicting, by using a prediction model, a degree of preference of a target user for each image based on user feature data of the target user and the image feature data includes: for each image, obtaining a content eigenvector based on the candidate content in the image, where the content eigenvector represents the candidate content, and because a title of news content can well indicate main information of the news content, when the candidate content is news content, a title of the news content may be converted into a title eigenvector; determining a weight of the content eigenvector and a weight of the global eigenvector based on the content eigenvector and the global eigenvector, where because the user may have different sensitivity to visual impression information and text semantics, in an implementation, the weight of the content eigenvector and the weight of the global eigenvector may be adaptively controlled by using a threshold addition network; performing fusion on the content eigenvector and the global eigenvector based on the weight of the content eigenvector and the weight of the global eigenvector to obtain a third fusion eigenvector; and predicting, by using the prediction model, the degree of preference of the target user for each image based on the user eigenvector and the third fusion eigenvector, where input for the prediction model is determined based on the user eigenvector and the third fusion vector, and the user eigenvector represents the user feature data of the target user.

The weight of the content eigenvector and the weight of the global eigenvector are determined based on the content eigenvector and the global eigenvector, and the third fusion eigenvector obtained by performing fusion on the content eigenvector and the global eigenvector based on the weight of the content eigenvector and the weight of the global eigenvector can represent and extract, from a global perspective, impression feature information of the image for the user. Therefore, the degree of preference of the target user for each image is predicted by using the third fusion eigenvector, so that accuracy of prediction for a degree of preference of a user for an image can be improved.

In an implementation, the selecting, based on the degree of preference, a candidate interface and/or candidate content from candidate interfaces and candidate content that are included in the plurality of images, to perform recommendation includes: selecting, based on the degree of preference, a type of candidate content from the candidate content included in the plurality of images as target candidate content; and selecting, based on the degree of preference, a candidate interface from candidate interfaces of images that include the target candidate content as a target candidate interface, to recommend the target candidate content by using the target candidate interface.

A type of candidate content is selected, based on the degree of preference, from the candidate content included in the plurality of images as target candidate content, a candidate interface is selected, based on the degree of preference, from candidate interfaces of images that include the target candidate content as a target candidate interface, and the target candidate content is recommended by using the target candidate interface. In this way, candidate content of a user's preference is recommended to the user by using a candidate interface of the user's preference, so that a probability that a user clicks/taps recommended content can be increased.

In an implementation, after the selecting, based on the degree of preference, a candidate interface from candidate interfaces of images that include the target candidate content as a target candidate interface, the method further includes: sending the target candidate content and metadata of the target candidate interface to a terminal device, so that the terminal device displays the target candidate interface based on the metadata, and recommends the target candidate content to the target user by using the target candidate interface, where the metadata includes various types of configuration data of the target candidate interface.

The target candidate content and the metadata of the target candidate interface are sent to the terminal device, so that the terminal device displays the target candidate interface based on the metadata, and recommends the target candidate content to the target user by using the target candidate interface. In this way, a probability that a user clicks/taps recommended content can be increased.

According to a second aspect, an embodiment of this application provides a training method. The method includes: obtaining a plurality of sample images, where each sample image includes one sample candidate interface and one type of sample candidate content presented by using the sample candidate interface; obtaining image feature data of each sample image; predicting, by using a prediction model, a degree of preference of a sample user for each sample image based on user feature data of the sample user and the image feature data, where input for the prediction model is determined based on the user feature data and the image feature data; and adjusting the prediction model based on the degree of preference and historical click-through data of the sample user for the sample candidate content. The historical click-through data of the sample user for the sample candidate content may include: whether the sample user clicks/taps the sample candidate content, and a quantity of times that the sample user clicks/taps the sample candidate content. Specifically, a weight of the prediction model may be adjusted, or a structure of the prediction model may be adjusted.

A sample image includes both sample candidate content and a sample candidate interface. Therefore, a prediction model obtained through training based on image feature data of the sample image can accurately output a degree of preference of a user for the image by considering influence of both the candidate content and the candidate interface on the user, to recommend content that the user is interested in to the user by using an interface that the user is interested in, so as to increase a rate of clicking/tapping recommended content by users.

In an implementation, each sample image includes a plurality of regions, the image feature data of each sample image includes a plurality of local eigenvectors, and each local eigenvector represents one region.

For related descriptions and technical effect, refer to the descriptions of the first aspect of embodiments of this application.

In an implementation, the predicting, by using a prediction model, a degree of preference of a sample user for each sample image based on user feature data of the sample user and the image feature data includes: for each sample image, obtaining N word vectors based on the sample candidate content in each sample image, where each word vector represents one word in the sample candidate content, and N is a positive integer; for each word vector, calculating, by using a model of an attention mechanism, an attention weight of each of the plurality of local eigenvectors based on the word vector and the plurality of local eigenvectors, where the attention weight indicates a degree to which the sample user pays attention to a region represented by the local eigenvector when the sample user reads a word represented by each word vector; performing fusion on each word vector and the plurality of local eigenvectors based on the attention weight of each of the plurality of local eigenvectors to obtain a first fusion eigenvector, where one first fusion eigenvector is correspondingly obtained for each word vector; and predicting, by using the prediction model, the degree of preference of the sample user for each sample image based on the user eigenvector and N first fusion eigenvectors corresponding to the N word vectors, where input for the prediction model is determined based on the user eigenvector and the N first fusion eigenvectors, and the user eigenvector represents the user feature data of the sample user.

For related descriptions and technical effect, refer to the descriptions of the first aspect of embodiments of this application.

In an implementation, the predicting, by using the prediction model, the degree of preference of the sample user for each sample image based on the user eigenvector and N first fusion eigenvectors corresponding to the N word vectors includes: for each sample image, processing, by using a model of a self-attention mechanism, the N first fusion eigenvectors corresponding to the N word vectors to obtain N semantic-enhanced eigenvectors, where each first fusion eigenvector corresponds to one semantic-enhanced eigenvector; and predicting, by using the prediction model, the degree of preference of the sample user for each sample image based on the user eigenvector and the N semantic-enhanced eigenvectors, where input for the prediction model is determined based on the user eigenvector and the N semantic-enhanced eigenvectors.

For related descriptions and technical effect, refer to the descriptions of the first aspect of embodiments of this application.

In an implementation, the predicting, by using the prediction model, the degree of preference of the sample user for each sample image based on the user eigenvector and the N semantic-enhanced eigenvectors includes: for each sample image, performing fusion on the N semantic-enhanced eigenvectors by using a model of an additive attention mechanism to obtain a second fusion eigenvector; and predicting, by using the prediction model, the degree of preference of the sample user for each sample image based on the user eigenvector and the second fusion eigenvector, where input for the prediction model is determined based on the user eigenvector and the second fusion eigenvector.

For related descriptions and technical effect, refer to the descriptions of the first aspect of embodiments of this application.

In an implementation, the image feature data of each sample image includes a global eigenvector, and the global eigenvector represents the sample image.

For related descriptions and technical effect, refer to the descriptions of the first aspect of embodiments of this application.

In an implementation, the predicting, by using a prediction model, a degree of preference of a sample user for each sample image based on user feature data of the sample user and the image feature data includes: for each sample image, obtaining a content eigenvector based on the sample candidate content in each sample image, where the content eigenvector represents the sample candidate content; determining a weight of the content eigenvector and a weight of the global eigenvector based on the content eigenvector and the global eigenvector; performing fusion on the content eigenvector and the global eigenvector based on the weight of the content eigenvector and the weight of the global eigenvector to obtain a third fusion eigenvector; and predicting, by using the prediction model, the degree of preference of the sample user for each sample image based on the user eigenvector and the third fusion eigenvector, where input for the prediction model is determined based on the user eigenvector and the third fusion vector, and the user eigenvector represents the user feature data of the sample user.

For related descriptions and technical effect, refer to the descriptions of the first aspect of embodiments of this application.

According to a third aspect, an embodiment of this application provides a recommendation apparatus. The recommendation apparatus includes: a first image obtaining unit, configured to obtain a plurality of images, where each image includes one candidate interface and one type of candidate content presented by using the candidate interface; a first feature data obtaining unit, configured to obtain image feature data of each image; a first prediction unit, configured to predict, by using a prediction model, a degree of preference of a target user for each image based on user feature data of the target user and the image feature data, where input for the prediction model is determined based on the user feature data and the image feature data; and a recommendation unit, configured to select, based on the degree of preference, a candidate interface and/or candidate content from candidate interfaces and candidate content that are included in the plurality of images, to perform recommendation.

In an implementation, each image includes a plurality of regions, the image feature data of each image includes a plurality of local eigenvectors, and each local eigenvector represents one region.

In an implementation, the first prediction unit is configured to: for each image, obtain N word vectors based on the candidate content in the image, where each word vector represents one word in the candidate content, and N is a positive integer; for each word vector, calculate, by using a model of an attention mechanism, an attention weight of each of the plurality of local eigenvectors based on the word vector and the plurality of local eigenvectors, where the attention weight indicates a degree to which the target user pays attention to a region represented by the local eigenvector when the target user reads a word represented by each word vector; perform fusion on each word vector and the plurality of local eigenvectors based on the attention weight of each of the plurality of local eigenvectors to obtain a first fusion eigenvector, where one first fusion eigenvector is correspondingly obtained for each word vector; and predict, by using the prediction model, the degree of preference of the target user for each image based on the user eigenvector and N first fusion eigenvectors corresponding to the N word vectors, where input for the prediction model is determined based on the user eigenvector and the N first fusion eigenvectors, and the user eigenvector represents the user feature data of the target user.

In an implementation, the first prediction unit is configured to: for each image, process, by using a model of a self-attention mechanism, the N first fusion eigenvectors corresponding to the N word vectors to obtain N semantic-enhanced eigenvectors, where each first fusion eigenvector corresponds to one semantic-enhanced eigenvector; and predict, by using the prediction model, the degree of preference of the target user for each image based on the user eigenvector and the N semantic-enhanced eigenvectors, where input for the prediction model is determined based on the user eigenvector and the N semantic-enhanced eigenvectors.

In an implementation, that the first prediction unit is configured to predict, by using the prediction model, the degree of preference of the target user for each image based on the user eigenvector and the N semantic-enhanced eigenvectors includes: for each image, performing fusion on the N semantic-enhanced eigenvectors by using a model of an additive attention mechanism to obtain a second fusion eigenvector; and predicting, by using the prediction model, the degree of preference of the target user for each image based on the user eigenvector and the second fusion eigenvector, where input for the prediction model is determined based on the user eigenvector and the second fusion eigenvector.

In an implementation, the image feature data of each image includes a global eigenvector, and the global eigenvector represents the image.

In an implementation, the first prediction unit is configured to: for each image, obtain a content eigenvector based on the candidate content in the image, where the content eigenvector represents the candidate content; determine a weight of the content eigenvector and a weight of the global eigenvector based on the content eigenvector and the global eigenvector; perform fusion on the content eigenvector and the global eigenvector based on the weight of the content eigenvector and the weight of the global eigenvector to obtain a third fusion eigenvector; and predict, by using the prediction model, the degree of preference of the target user for each image based on the user eigenvector and the third fusion eigenvector, where input for the prediction model is determined based on the user eigenvector and the third fusion vector, and the user eigenvector represents the user feature data of the target user.

In an implementation, the recommendation unit is configured to: select, based on the degree of preference, a type of candidate content from the candidate content included in the plurality of images as target candidate content; and select, based on the degree of preference, a candidate interface from candidate interfaces of images that include the target candidate content as a target candidate interface, to recommend the target candidate content by using the target candidate interface.

In an implementation, the apparatus further includes a sending unit, configured to send the target candidate content and metadata of the target candidate interface to a terminal device, so that the terminal device displays the target candidate interface based on the metadata, and recommends the target candidate content to the target user by using the target candidate interface.

For specific implementations, related descriptions, and technical effect of the foregoing units, refer to the descriptions of the first aspect of embodiments of this application.

According to a fourth aspect, an embodiment of this application provides a training apparatus. The training apparatus includes: a second image obtaining unit, configured to obtain a plurality of sample images, where each sample image includes one sample candidate interface and one type of sample candidate content presented by using the sample candidate interface; a second feature data obtaining unit, configured to obtain image feature data of each sample image; a second prediction unit, configured to predict, by using a prediction model, a degree of preference of a sample user for each sample image based on user feature data of the sample user and the image feature data, where input for the prediction model is determined based on the user feature data and the image feature data; and an adjustment unit, configured to adjust the prediction model based on the degree of preference and historical click-through data of the sample user for the sample candidate content.

In an implementation, each sample image includes a plurality of regions, the image feature data of each sample image includes a plurality of local eigenvectors, and each local eigenvector represents one region.

In an implementation, the second prediction unit is configured to: for each sample image, obtain N word vectors based on the sample candidate content in each sample image, where each word vector represents one word in the sample candidate content, and N is a positive integer; for each word vector, calculate, by using a model of an attention mechanism, an attention weight of each of the plurality of local eigenvectors based on the word vector and the plurality of local eigenvectors, where the attention weight indicates a degree to which the sample user pays attention to a region represented by the local eigenvector when the sample user reads a word represented by each word vector; perform fusion on each word vector and the plurality of local eigenvectors based on the attention weight of each of the plurality of local eigenvectors to obtain a first fusion eigenvector, where one first fusion eigenvector is correspondingly obtained for each word vector; and predict, by using the prediction model, the degree of preference of the sample user for each sample image based on the user eigenvector and N first fusion eigenvectors corresponding to the N word vectors, where input for the prediction model is determined based on the user eigenvector and the N first fusion eigenvectors, and the user eigenvector represents the user feature data of the sample user.

In an implementation, the second prediction unit is configured to: for each sample image, process, by using a model of a self-attention mechanism, the N first fusion eigenvectors corresponding to the N word vectors to obtain N semantic-enhanced eigenvectors, where each first fusion eigenvector corresponds to one semantic-enhanced eigenvector; and predict, by using the prediction model, the degree of preference of the sample user for each sample image based on the user eigenvector and the N semantic-enhanced eigenvectors, where input for the prediction model is determined based on the user eigenvector and the N semantic-enhanced eigenvectors.

In an implementation, the second prediction unit is configured to: for each sample image, perform fusion on the N semantic-enhanced eigenvectors by using a model of an additive attention mechanism to obtain a second fusion eigenvector; and predict, by using the prediction model, the degree of preference of the sample user for each sample image based on the user eigenvector and the second fusion eigenvector, where input for the prediction model is determined based on the user eigenvector and the second fusion eigenvector.

In an implementation, the image feature data of each sample image includes a global eigenvector, and the global eigenvector represents the sample image.

In an implementation, the second prediction unit is configured to: for each sample image, obtain a content eigenvector based on the sample candidate content in each sample image, where the content eigenvector represents the sample candidate content; determine a weight of the content eigenvector and a weight of the global eigenvector based on the content eigenvector and the global eigenvector; perform fusion on the content eigenvector and the global eigenvector based on the weight of the content eigenvector and the weight of the global eigenvector to obtain a third fusion eigenvector; and predict, by using the prediction model, the degree of preference of the sample user for each sample image based on the user eigenvector and the third fusion eigenvector, where input for the prediction model is determined based on the user eigenvector and the third fusion vector, and the user eigenvector represents the user feature data of the sample user.

For specific implementations, related descriptions, and technical effect of the foregoing units, refer to the descriptions of the second aspect of embodiments of this application.

According to a fifth aspect, an embodiment of this application provides a computer device, including one or more processors and a memory. The memory stores computer-readable instructions. The one or more processors read the computer-readable instructions, so that a vehicle-mounted device implements the method according to any one of the implementations of the first aspect.

According to a sixth aspect, an embodiment of this application provides a training device, including one or more processors and a memory. The memory stores computer-readable instructions. The one or more processors read the computer-readable instructions, so that a vehicle-mounted device implements the method according to any one of the implementations of the second aspect.

According to a seventh aspect, an embodiment of this application provides a computer-readable storage medium, including computer-readable instructions. When the computer-readable instructions run on a computer, the computer is enabled to perform the method according to any one of the implementations of the first aspect or the second aspect.

According to an eighth aspect, an embodiment of this application provides a chip, including one or more processors. Some or all of the processors are configured to read and execute a computer program stored in a memory, to perform the method according to any one of the possible implementations of the first aspect or the second aspect.

Optionally, the chip includes the memory, and the memory and the processor are connected to the memory through a circuit or a wire. Further, optionally, the chip further includes a communication interface, and the processor is connected to the communication interface. The communication interface is configured to receive data and/or information that need to be processed. The processor obtains the data and/or the information from the communication interface, processes the data and/or the information, and outputs a processing result through the communication interface. The communication interface may be an input/output interface.

In some implementations, some of the one or more processors may alternatively implement some steps of the foregoing methods by using dedicated hardware. For example, processing related to a neural network model may be implemented by a dedicated neural network processor or graphics processing unit.

The methods provided in embodiments of this application may be implemented by one chip, or may be implemented by a plurality of chips through collaboration.

According to a ninth aspect, an embodiment of this application provides a computer program product. The computer program product includes computer software instructions. The computer software instructions may be loaded by a processor to implement the method according to any one of the implementations of the first aspect or the second aspect.

According to a tenth aspect, an embodiment of this application provides a recommendation system, including a terminal device and a server.

The server is configured to perform the method according to any one of the implementations of the first aspect.

The terminal device is configured to: receive target candidate content and metadata of a target candidate interface from the server; and
display the target candidate interface based on the metadata, and recommend the target candidate content to a target user by using the target candidate interface.

DESCRIPTION OF EMBODIMENTS

The following describes embodiments of this application with reference to accompanying drawings. Clearly, the described embodiments are merely some but not all of embodiments of this application. A person of ordinary skill in the art can know that technical solutions provided in embodiments of this application are also applicable to similar technical problems with development of technologies and emergence of new scenarios.

In the specification, claims, and accompanying drawings of this application, the terms "first", "second", and the like are intended to distinguish between similar objects but do not necessarily indicate a specific order or sequence. It should be understood that data used in this way is interchangeable in proper circumstances, so that embodiments described herein can be implemented in an order other than the order illustrated or described herein. In addition, the terms "comprise", "include", and any variants are intended to cover a non-exclusive inclusion. For example, a process, method, system, product, or device that includes a list of steps or modules is not necessarily limited to those steps or modules that are expressly listed, but may include other steps or modules that are not expressly listed or are inherent to the process, method, product, or device. Names or numbers of steps in this application do not mean that steps in a method process need to be performed in a chronological or logical sequence indicated by the names or numbers. An execution sequence of steps in a process that have been named or numbered may be changed based on a technical objective to be achieved, provided that same or similar technical effect can be achieved.

In addition, in descriptions of the present invention, "a plurality of" means two or more, unless otherwise specified. In this application, the term "and/or" or the character "/" describes only an association relationship between associated objects, and indicates that three relationships may exist. For example, A and/or B, or A/B may indicate the following three cases: Only A exists, both A and B exist, and only B exists.

Figure 1:
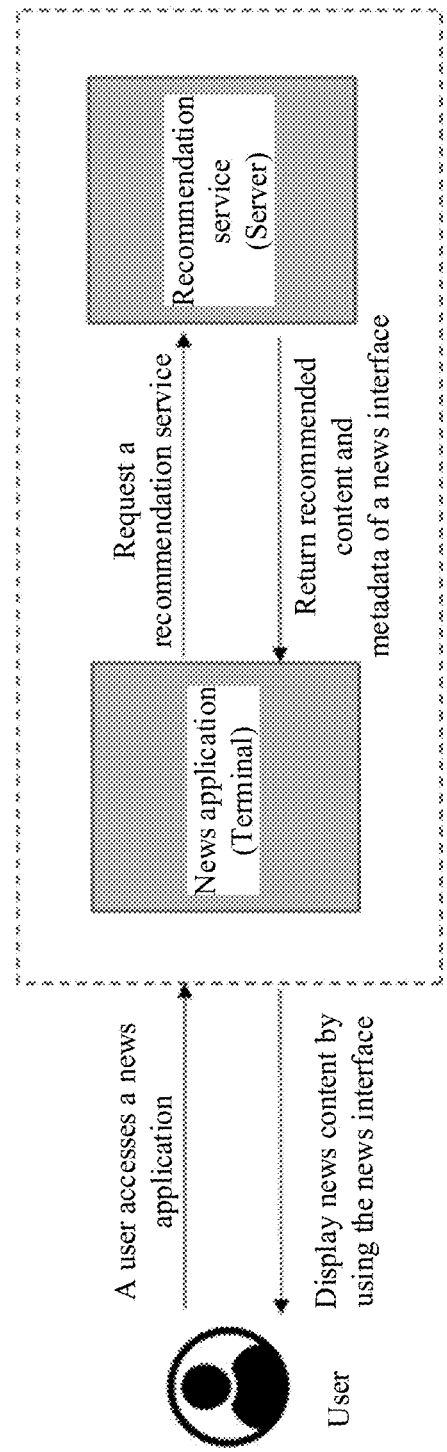
FIG. 1 is a schematic diagram of an architecture of a news recommendation system according to an embodiment of this application.

Embodiments of this application may be applied to a news recommendation system shown in FIG. 1. As shown in FIG. 1, the news recommendation system includes a terminal device and a server, and the terminal device is communicatively connected to the server.

A type of the terminal device is not specifically limited in this embodiment of this application. For example, the terminal device may include any device on which a news application can be deployed, for example, a mobile phone, a tablet computer, a desktop computer, or a vehicle-mounted device. The terminal device is referred to as a terminal for short below.

The server may be a common server or a cloud server.

As shown in FIG. 1, a news application is deployed on the terminal, and a recommendation service is deployed on the server.

When a user accesses the news application on the terminal, the terminal sends a request to the server to request the recommendation service on the server. After receiving the request, the server starts the recommendation service, and then selects, from massive news content, news content that the user is interested in as recommended news content. Then the server sends the recommended news content to the terminal, and then the terminal displays the recommended news content to the user.

Figure 2:
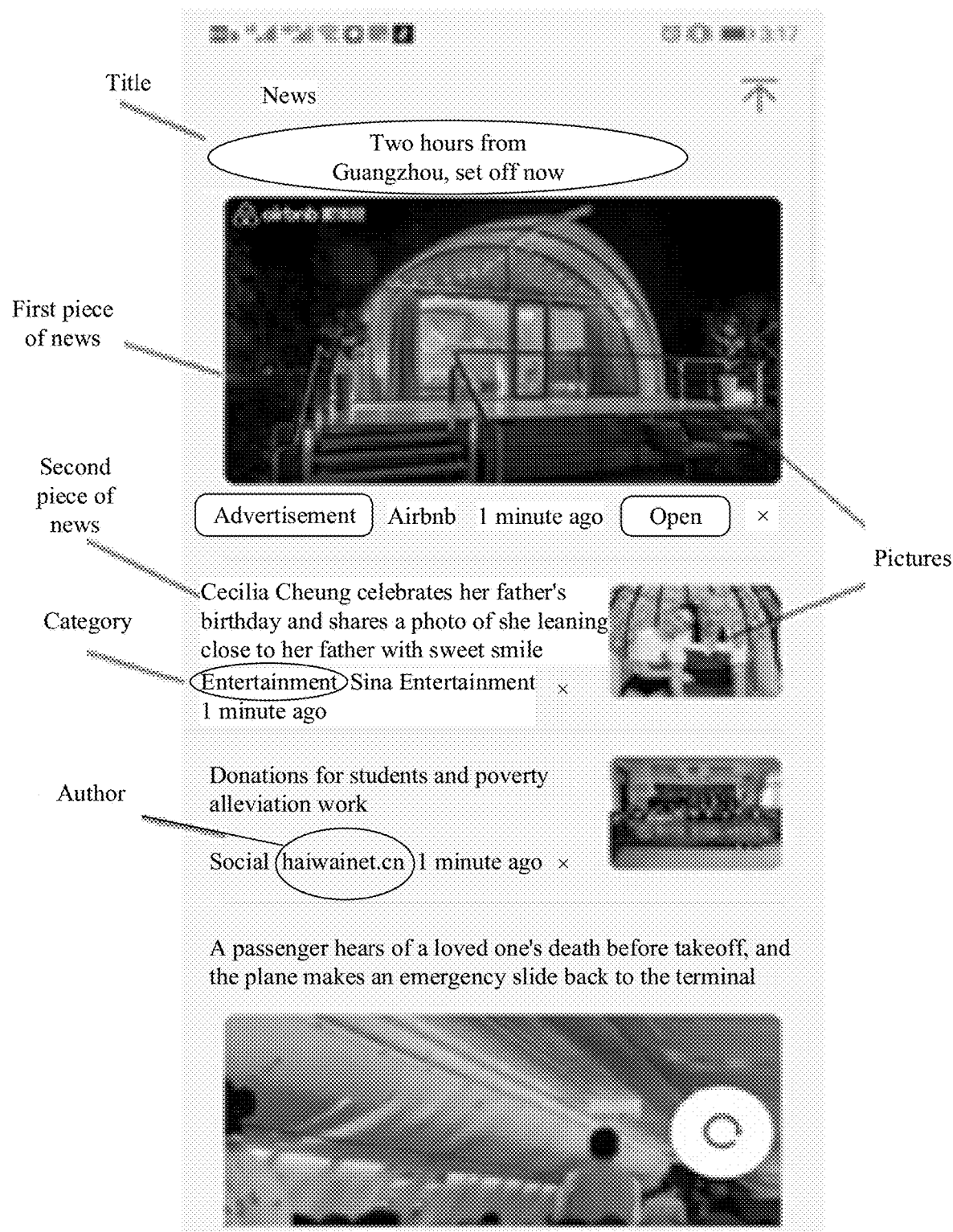
FIG. 2 is a schematic diagram of an embodiment of news.

The news content is not specifically limited in this embodiment of this application. For example, as shown in FIG. 2, the news content may include a news title, a news author, and a news category. In addition, the news content may further include news text.

However, for a piece of news, in addition to news content, a news interface for presenting the news content also affects a click-through rate of the news. Specifically, a text and picture layout (including a location of a title and relative locations of the title and a picture) on the news interface, whether a picture is included, a picture size, a picture color, a picture resolution, a font type, and a font size all leave different visual impressions on a user, affecting browsing experience of the user and therefore affecting click/tap behavior of the user on the news.

In this embodiment of this application, information, on a news interface, that leaves a visual impression on a user is referred to as visual impression information. The visual impression information may be understood as multi-modal information of news displayed on the news interface from a perspective of the user, and may specifically include a text and picture layout, whether a picture is included, a picture size, a picture color, a picture resolution, a font type, a font size, and other information.

FIG. 2 is used as an example. In comparison, a first piece of news and a second piece of news in FIG. 2 have different text and picture layouts and picture sizes. A probability that a user who likes a large picture clicks/taps the first piece of news is high.

Based on this, to increase a click-through rate of news, an embodiment of this application provides a recommendation method. In the method, a plurality of images are obtained, where each image includes one candidate interface and one type of candidate content; then a degree of preference of a target user for each image is predicted based on user feature data of the target user and image feature data of the image by using a prediction model; and finally, candidate content and/or a candidate interface are selected from the plurality of images based on the degree of preference, to perform recommendation. In the recommendation method, the candidate interface may be a news interface, and the candidate content may be news content. In this way, news recommendation can be implemented in the recommendation method. In addition, during news recommendation by using the recommendation method, influence of both the news content and the news interface on the target user is considered. In this way, news (including news content and a news interface) that the target user is interested in can be recommended to the target user, to further increase a click-through rate of news.

It should be noted that, in addition to news content, the candidate content may alternatively be other content such as a short video or commodity information. Correspondingly, in addition to a news interface, the candidate interface may alternatively be an interface for presenting a short video or an interface for presenting commodity information. The following describes methods provided in embodiments of this application by using an example in which the candidate content is news content and the candidate interface is a news interface.

Therefore, in the news recommendation system shown in FIG. 1, the server may further select a news interface that a user is interested in, and then send metadata of the news interface to the terminal, and then the terminal displays the news interface based on the metadata, and displays recommended news content to the user by using the news interface.

It can be learned from the foregoing descriptions that a prediction model needs to be used during news recommendation. Therefore, the prediction model needs to be obtained through pre-training.

Figure 3:
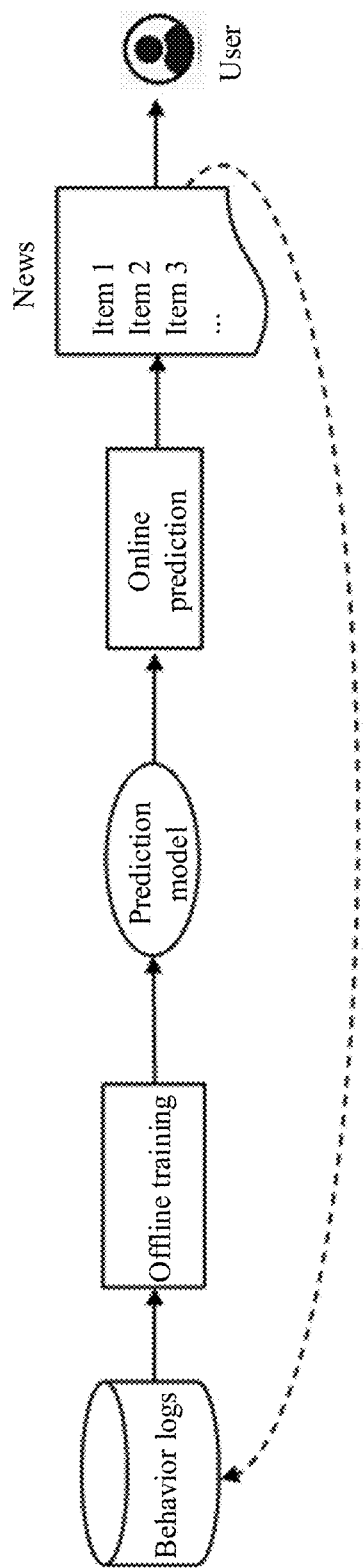
FIG. 3 is a schematic diagram of an operating process of a news recommendation system.

Specifically, an operating process of the news recommendation system shown in FIG. 1 may be shown in FIG. 3.

The server extracts news-related data (which may specifically include news browsing data or news click-through data) from behavior logs of a user, constructs training data by using the news-related data, and then performs offline training based on the training data to obtain a prediction model. After receiving a request for the recommendation service, the server performs online prediction by using the prediction model to obtain a degree of preference of the user for a plurality of news images, and then selects news content and a news interface based on the degree of preference. Finally, the terminal displays the news content to the user by using the news interface.

The following first describes an offline training process for the prediction model.

Figure 4:
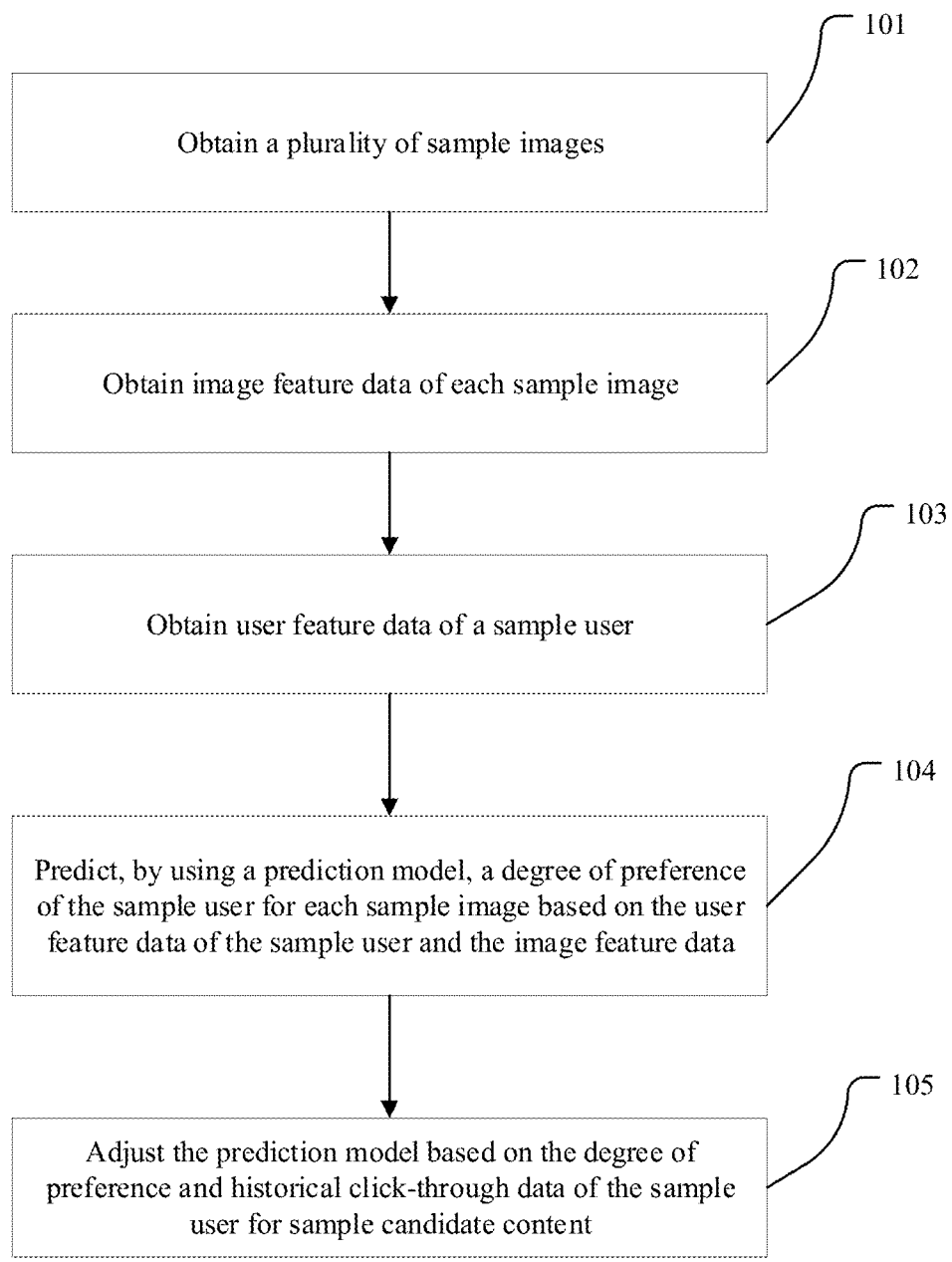
FIG. 4 is a schematic diagram of an embodiment of a training method according to an embodiment of this application.

As shown in FIG. 4, an embodiment of this application provides an embodiment of a training method. This embodiment is usually applied to a server. Specifically, this embodiment includes the following steps.

Step 101: Obtain a plurality of sample images, where each sample image includes one sample candidate interface and one type of sample candidate content presented by using the sample candidate interface.

The sample image may be understood as an image in which sample candidate content is presented by using a sample candidate interface. The sample candidate interface and the sample candidate content may be understood with reference to the foregoing related descriptions of the candidate interface and the candidate content.

The plurality of sample images may include the following three cases.

In a first case, the plurality of sample images include one sample candidate interface and a plurality of types of sample candidate content, that is, sample candidate interfaces in all sample images are the same.

In a second case, the plurality of sample images include a plurality of sample candidate interfaces and one type of sample candidate content, that is, sample candidate content in all sample images is the same.

In a third case, the plurality of sample images include a plurality of sample candidate interfaces and a plurality of types of sample candidate content. In this case, all sample images including a same type of sample candidate content may include a plurality of types of sample candidate content. For example, there are 10,000 sample images, the 10,000 sample images include 100 types of sample candidate content, and all sample images including a same type of sample candidate content include 100 sample candidate interfaces, that is, each type of sample candidate content may be presented by using 100 sample candidate interfaces.

Step 102: Obtain image feature data of each sample image.

There are a plurality of methods for obtaining image feature data of a sample image. This is not specifically limited in this embodiment of this application.

Based on different obtaining methods, in this embodiment of this application, image feature data is generally classified into two types: global visual impression feature data and local visual impression feature data. It should be noted that image feature data may include only global visual impression feature data, may include only local visual impression feature data, or may include both global visual impression feature data and local visual impression feature data.

In an implementation, each sample image includes a plurality of regions. Correspondingly, the image feature data of each sample image includes a plurality of local eigenvectors, and each local eigenvector represents one region. In this case, the image feature data may also be referred to as local visual impression feature data.

It should be noted that a sample image may be divided by using a plurality of methods to obtain a plurality of regions. For example, based on the foregoing descriptions, it can be learned that one piece of news may include a news title, a news author, a news category, and other parts. In addition, the news may further include a picture part. Therefore, region coordinates of the foregoing parts may be obtained based on news typesetting, and then the sample image is divided into the plurality of regions based on the region coordinates.

Figure 5:
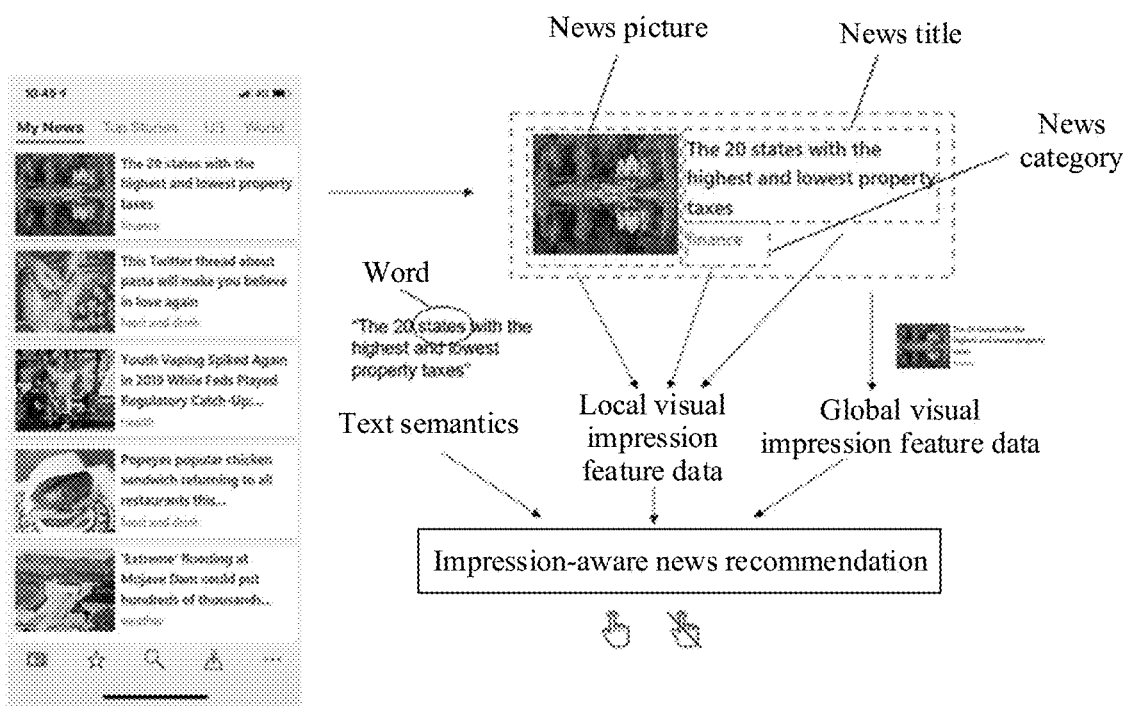
FIG. 5 is a schematic diagram of regions of a sample image according to an embodiment of this application.

For example, FIG. 5 is used as an example, and a sample image in FIG. 5 may be divided into three regions by using the foregoing method: a news title, a news category, and a news picture.

A method for obtaining a local eigenvector may specifically include: separately inputting images of a plurality of regions into a picture characterizer, to convert the plurality of regions into a plurality of local eigenvectors by using the picture characterizer. The picture characterizer may be understood as a model obtained through pre-training. There may be a plurality of types of models. For example, a type of the model may be ResNet101.

In an implementation, the image feature data of each sample image includes a global eigenvector, and the global eigenvector represents the sample image. In this case, the image feature data may also be referred to as global visual impression feature data.

A method for obtaining a global eigenvector may specifically include: inputting a sample image to a picture characterizer, to convert the sample image into a global eigenvector by using the picture characterizer. The picture characterizer is described above. Therefore, details are not described herein again.

Step 103: Obtain user feature data of a sample user.

A type of feature data of the sample user is not specifically limited in this embodiment of this application. For example, the feature data of the sample user includes age information of the sample user, a city in which the sample user is located, and news-related historical data of the sample user. The news-related historical data of the sample user may specifically include a type of news browsed by the sample user, a type of news clicked/tapped by the sample user, time at which the sample user clicks/taps the news, a place at which the sample user clicks/taps the news, and the like.

The news-related historical data of the sample user may be obtained from behavior logs of the sample user.

Step 104: Predict, by using a prediction model, a degree of preference of the sample user for each sample image based on the user feature data of the sample user and the image feature data, where input for the prediction model is determined based on the user feature data and the image feature data.

It should be noted that the user feature data and the image feature data may alternatively be combined with specific environment information (for example, time, a date, whether the day is a weekend, or whether the day is a holiday), and the degree of preference of the sample user for each sample image is predicted by using the prediction model.

For a sample image, the feature data of the sample user and image feature data may be directly input to the prediction model to obtain a degree of preference, output by the prediction model, of the sample user for the sample image; or the image feature data may be first processed to obtain intermediate feature data, and then the feature data of the sample user and the intermediate feature data are input to the prediction model to obtain a degree of preference, output by the prediction model, of the sample user for the sample image.

The following describes in detail a process of predicting the degree of preference of the sample user for each sample image by using the prediction model.

Step 105: Adjust the prediction model based on the degree of preference and historical click-through data of the sample user for the sample candidate content.

The historical click-through data of the sample user for the sample candidate content may include: whether the sample user clicks/taps the sample candidate content, and a quantity of times that the sample user clicks/taps the sample candidate content.

Specifically, a sample label may be set based on the historical click-through data of the sample user for the sample candidate content. For example, for a sample image, if the sample user has clicked/tapped sample candidate content in the sample image, a sample label of a degree of preference may be set to 1; or if the sample user has not clicked/tapped the sample candidate content in the sample image, a sample label of a degree of preference may be set to 0.

For another example, for a sample image, if a quantity of times that the sample user clicks/taps sample candidate content in the sample image is greater than or equal to a first threshold, a sample label of a degree of preference may be set to 1; if a quantity of times that the sample user clicks/taps the sample candidate content in the sample image is less than the first threshold and greater than or equal to a second threshold, a sample label of a degree of preference may be set to 0.5; or if a quantity of times that the sample user clicks/taps the sample candidate content in the sample image is less than the second threshold or the sample user has not clicked/tapped the sample candidate content in the sample image, a sample label of a degree of preference may be set to 0.

Based on this, a loss function may be calculated based on the sample label and the degree of preference, output by the prediction model, of the sample user for the sample image; and through back propagation of the loss function, a weight of the prediction model is updated, or a structure of the prediction model is adjusted, so that a degree of preference output by the prediction model is close to the sample label.

In this embodiment of this application, a sample image includes both sample candidate content and a sample candidate interface. Therefore, a prediction model obtained through training based on image feature data of the sample image can accurately output a degree of preference of a user for the image by considering influence of both the candidate content and the candidate interface on the user, to recommend content that the user is interested in to the user by using an interface that the user is interested in, so as to increase a rate of clicking/tapping recommended content by users.

The following describes a process of predicting the degree of preference of the sample user for each sample image by using the prediction model.

First, a case in which image feature data includes local visual impression feature data is described.

Figure 6:
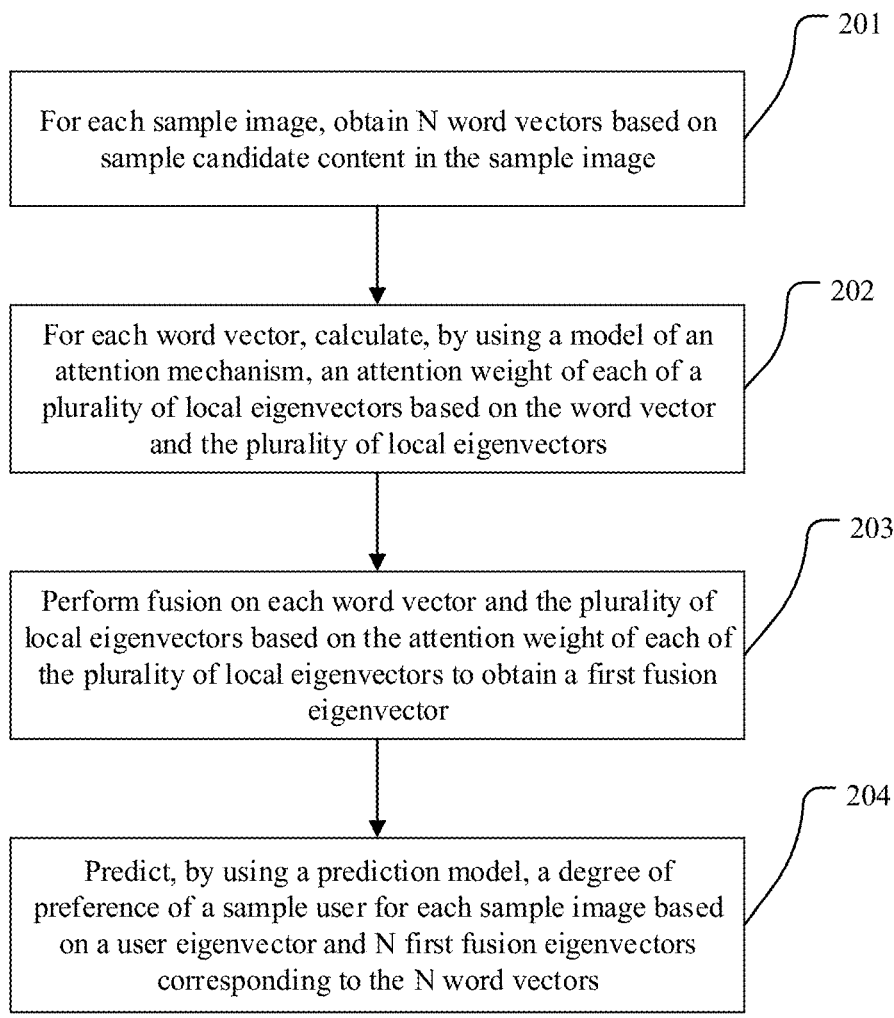
FIG. 6 is a schematic diagram of a first embodiment of predicting a degree of preference of a sample user for each sample image according to an embodiment of this application.

In an implementation, as shown in FIG. 6, step 104 includes the following steps.

Step 201: For each sample image, obtain N word vectors based on the sample candidate content in the sample image, where each word vector represents one word in the sample candidate content, and N is a positive integer.

The sample candidate content includes N words, and one word vector may be correspondingly generated for each word by using a text characterizer. Similar to the picture characterizer, the text characterizer may also be understood as a model obtained through pre-training. There may be a plurality of types of models. For example, the model may be a Bert model.

It can be understood that, when the sample candidate content is news content, a title of the news content usually can well indicate main information of the news content. Therefore, when the sample candidate content is news content, word segmentation may be performed on the title of the news content to obtain N words, and then N word vectors representing the N words are obtained by using the text characterizer.

Step 202: For each word vector, calculate, by using a model of an attention mechanism, an attention weight of each of the plurality of local eigenvectors based on the word vector and the plurality of local eigenvectors, where the attention weight indicates a degree to which the sample user pays attention to a region represented by the local eigenvector when the sample user reads a word represented by each word vector.

The attention mechanism is a mechanism of calculating attention weights of all parts of a neural network model and combining the attention weights into an attention vector to dynamically control, in the neural network model, a degree of attention to all parts or a specific part of the neural network model.

The attention mechanism includes a plurality of types. Usually, the attention mechanism includes two types. One type is top-down conscious attention, referred to as focused (focus) attention. The focused attention is attention that has a predetermined purpose, relies on a task, and consciously and actively focuses on a specific object. The other type is bottom-up unconscious attention, referred to as saliency-based (saliency-based) attention.

In addition, the attention mechanism further includes the following several variants: a multi-head attention (multi-head attention) mechanism, a hard attention mechanism, a key-value pair attention mechanism, and a structured attention mechanism.

In the multi-head attention (multi-head attention) mechanism, a plurality of pieces of information are selected from input information through parallel computation by using a plurality of queries, and different pieces of attention focus on different parts of the input information.

It should be noted that the foregoing attention mechanisms and variants of attention mechanisms are all applicable to this embodiment.

The following describes the foregoing process by using a specific example.

For example, $o_j$ indicates a $j^{th}$ local eigenvector, and $w_i$ indicates an $i^{th}$ word vector. Based on this, an attention weight of each of the plurality of local eigenvectors for the word vector $w_i$ may be calculated by using the following formula $$\alpha_{ij}^y 1 = \frac{\exp\left(q_m(w_i)^T k_m(o_j)\right)}{\Sigma_{k1} \exp\left(q_m(w_i)^T k_m(o_{k1})\right)},$$

where $\alpha_{ij}^y 1$ indicates the attention weight, $q_m(\bullet)$ and $k_m(\bullet)$ indicate linear transformations with a deviation term, and k1 indicates a number (that is, a $K1^{th}$) of a quantity of local eigenvectors.

FIG. 5 is used as an example. A sample image in FIG. 5 is divided into three regions: a news title, a news category, and a news picture. Correspondingly, local eigenvectors representing the three regions may be obtained. A word "states" is used as an example. For a word vector representing the word "states", attention weights of the local eigenvectors for the three regions respectively indicate degrees to which the sample user pays attention to the three regions when the sample user focuses on the word "states".

Step 203: Perform fusion on each word vector and the plurality of local eigenvectors based on the attention weight of each of the plurality of local eigenvectors to obtain a first fusion eigenvector, where one first fusion eigenvector is correspondingly obtained for each word vector.

Specifically, weighting may be performed on the plurality of local eigenvectors based on the attention weight of each of the plurality of local eigenvectors, and then a weighting result is added to the word vector to obtain the first fusion eigenvector.

The foregoing process may be implemented by using the following formula: $\hat{w}_i = \Sigma_j \alpha_{ij}^v 1 * v_m(o_j) + v(w_i)$, where $v_m(\cdot)$ indicates a linear transformation with a deviation term, and $\hat{w}_i$ indicates the first fusion eigenvector.

Step 204: Predict, by using the prediction model, the degree of preference of the sample user for each sample image based on the user eigenvector and N first fusion eigenvectors corresponding to the N word vectors, where input for the prediction model is determined based on the user eigenvector and the N first fusion eigenvectors, and the user eigenvector represents the user feature data of the sample user.

For example, for a sample image, the user eigenvector and the N first fusion eigenvectors may be directly input to the prediction model to obtain a degree of preference, output by the prediction model, of the sample user for the sample image; or the N first fusion eigenvectors may be first processed to obtain intermediate feature data, and then the user eigenvector and the intermediate feature data are input to the prediction model to obtain a degree of preference, output by the prediction model, of the sample user for the sample image.

Figure 7:
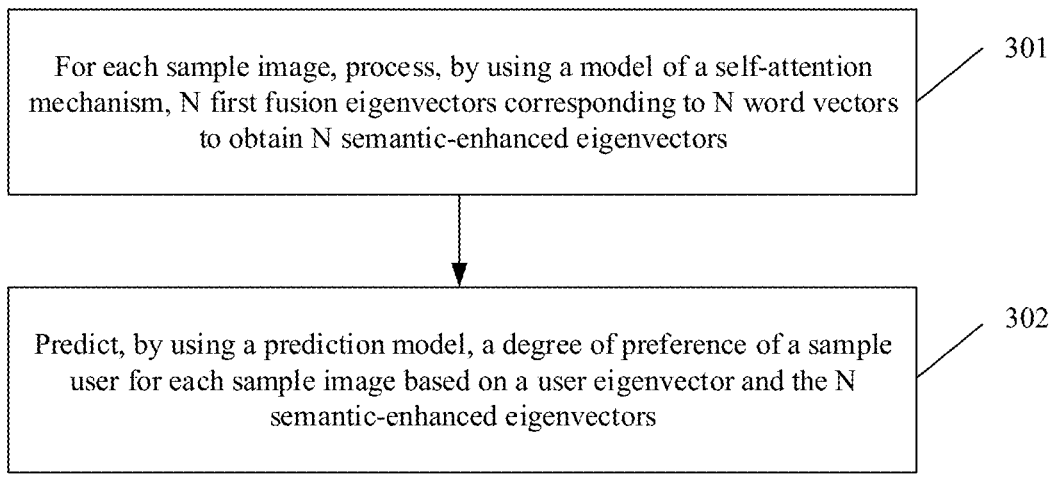
FIG. 7 is a schematic diagram of a second embodiment of predicting a degree of preference of a sample user for each sample image according to an embodiment of this application.

In an implementation, as shown in FIG. 7, step 204 includes the following steps.

Step 301: For each sample image, process, by using a model of a self-attention mechanism, the N first fusion eigenvectors corresponding to the N word vectors to obtain N semantic-enhanced eigenvectors, where each first fusion eigenvector corresponds to one semantic-enhanced eigenvector.

The self-attention mechanism (self-attention mechanism) is a mechanism obtained by improving the attention mechanism. Dependency on external information is reduced in the self-attention mechanism, and therefore the self-attention mechanism is better at capturing an internal correlation of data or a feature.

For example, in this embodiment of this application, the N first fusion eigenvectors are obtained based on the N word vectors, and words represented by the N word vectors come from same candidate content. Therefore, a correlation between the N first fusion eigenvectors can be better analyzed by using the self-attention mechanism. Correspondingly, the attention mechanism is used to capture an external correlation of data. Based on the foregoing descriptions, it can be learned that the attention mechanism is used to process a word vector and a plurality of local eigenvectors. An image region represented by a local eigenvector is external data relative to a word represented by a word vector. Therefore, in this embodiment of this application, a correlation between a word represented by a word vector and an image region represented by a local eigenvector is captured by using the attention mechanism.

The self-attention mechanism includes a single-head self-attention mechanism and a multi-head self-attention mechanism.

It can be understood, because the N first fusion eigenvectors are obtained based on the N word vectors and there is a semantic relationship between the N word vectors, correspondingly, there is also a semantic relationship between the N first fusion eigenvectors. Therefore, in this embodiment, semantic enhancement is performed on the N first fusion eigenvectors by using the model of the self-attention mechanism.

Specifically, a process of processing the N first fusion eigenvectors by using the model of the self-attention mechanism may include: processing the N first fusion eigenvectors by using the following formulas:

$$\alpha_{ij}^v 2 = \frac{\exp(q(\hat{w}_i)^T k(\hat{w}_j))}{\Sigma_{k2} \exp(q(\hat{w}_i)^T k(\hat{w}_{k2}))}$$

and $w^*_i = \Sigma_j \alpha_{ij}^v \widehat{2w_j}$, where $q(\cdot)$ and $k(\cdot)$ indicate linear transformations, $\alpha_{ij}^v 2$ indicates a degree of semantic enhancement of a $j^{th}$ first fusion eigenvector $\hat{w}_j$ with respect to an $i^{th}$ first fusion eigenvector $\hat{w}_i$, and k2 indicates a number (that is, a $K2^{th}$) of a quantity of local eigenvectors.

Step 302: Predict, by using the prediction model, the degree of preference of the sample user for each sample image based on the user eigenvector and the N semantic-enhanced eigenvectors, where input for the prediction model is determined based on the user eigenvector and the N semantic-enhanced eigenvectors.

For example, for a sample image, the user eigenvector and the N semantic-enhanced eigenvectors may be directly input to the prediction model to obtain a degree of preference, output by the prediction model, of the sample user for the sample image; or the N semantic-enhanced eigenvectors may be first processed to obtain intermediate feature data, and then the user eigenvector and the intermediate feature data are input to the prediction model to obtain a degree of preference, output by the prediction model, of the sample user for the sample image.

In an implementation, step 302 includes:

for each sample image, performing fusion on the N semantic-enhanced eigenvectors by using a model of an additive attention mechanism to obtain a second fusion eigenvector; and predicting, by using the prediction model, the degree of preference of the sample user for each sample image based on the user eigenvector and the second fusion eigenvector, where input for the prediction model is determined based on the user eigenvector and the second fusion eigenvector.

The performing fusion on the N semantic-enhanced eigenvectors by using a model of an additive attention mechanism includes: processing the N semantic-enhanced eigenvectors by using the following formulas:

$$\alpha_i^a = \frac{\exp q_a(\tanh(k_a(w_i^*)))}{\exp \Sigma_{k3} q_a(\tanh(k_a(w_{k3}^*)))}$$

and $e1 = \Sigma_i \alpha_i^a * w^*_i$, where $k_a$ is used to convert $w^*_i$ into a latent spatial vector, $q_a$ is used to calculate an attention weight during fusion, $\alpha_i^a$ indicates an attention weight of an $i^{th}$ semantic-enhanced eigenvector, e1 indicates the second fusion eigenvector, and k3 indicates a number (that is, a $K3^{th}$) of a quantity of local eigenvectors.

Figure 8:
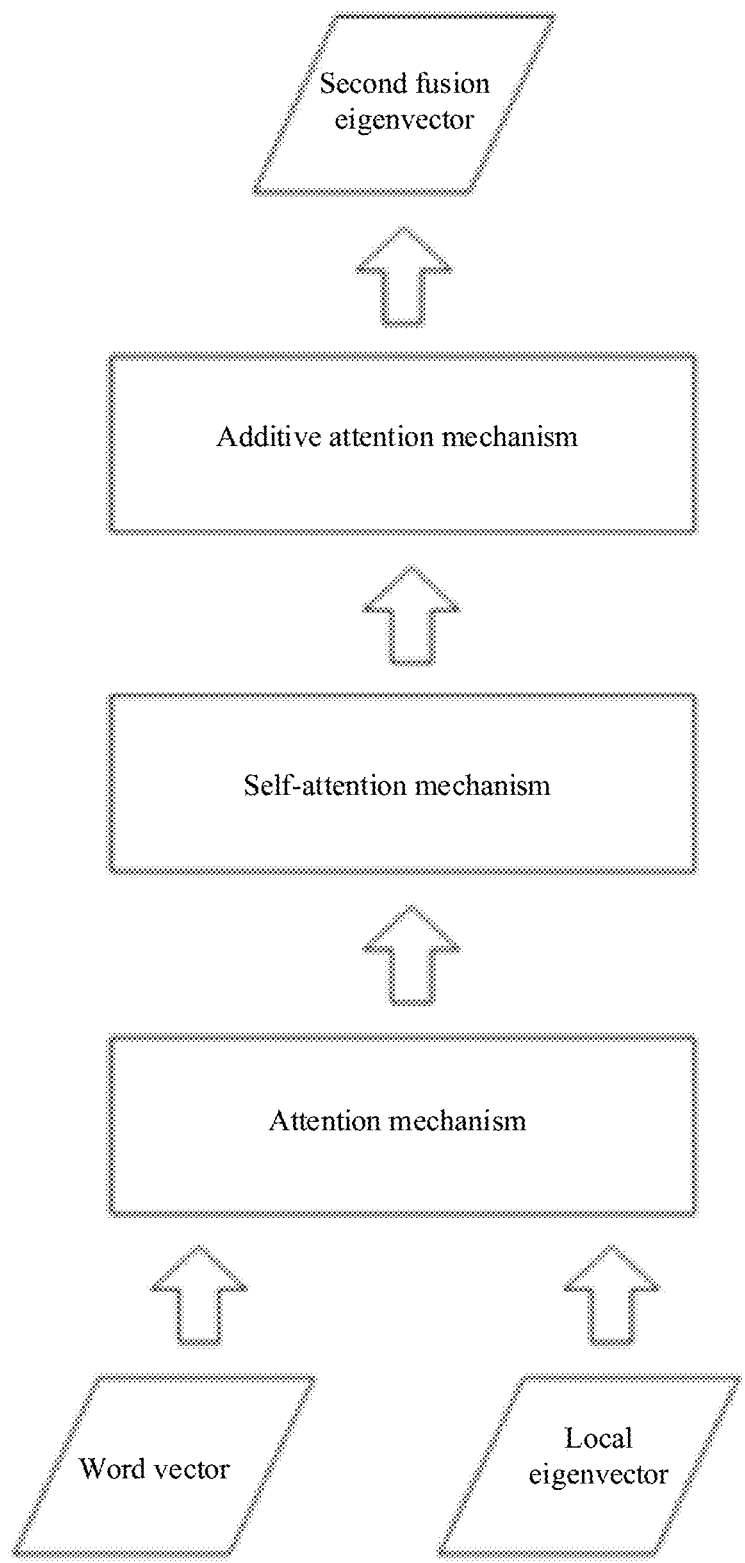
FIG. 8 is a schematic diagram of a process of obtaining a second fusion eigenvector according to an embodiment of this application.

Based on the foregoing descriptions, in an implementation, as shown in FIG. 8, a process of obtaining the second fusion eigenvector may be summarized as follows: The word vector and the local eigenvector are used as input and are sequentially processed by using the attention mechanism, the self-attention mechanism, and the additive attention mechanism to output the second fusion eigenvector.

The foregoing describes a case in which image feature data includes local visual impression feature data, and the following describes a case in which image feature data includes global visual impression feature data.

Figure 9:
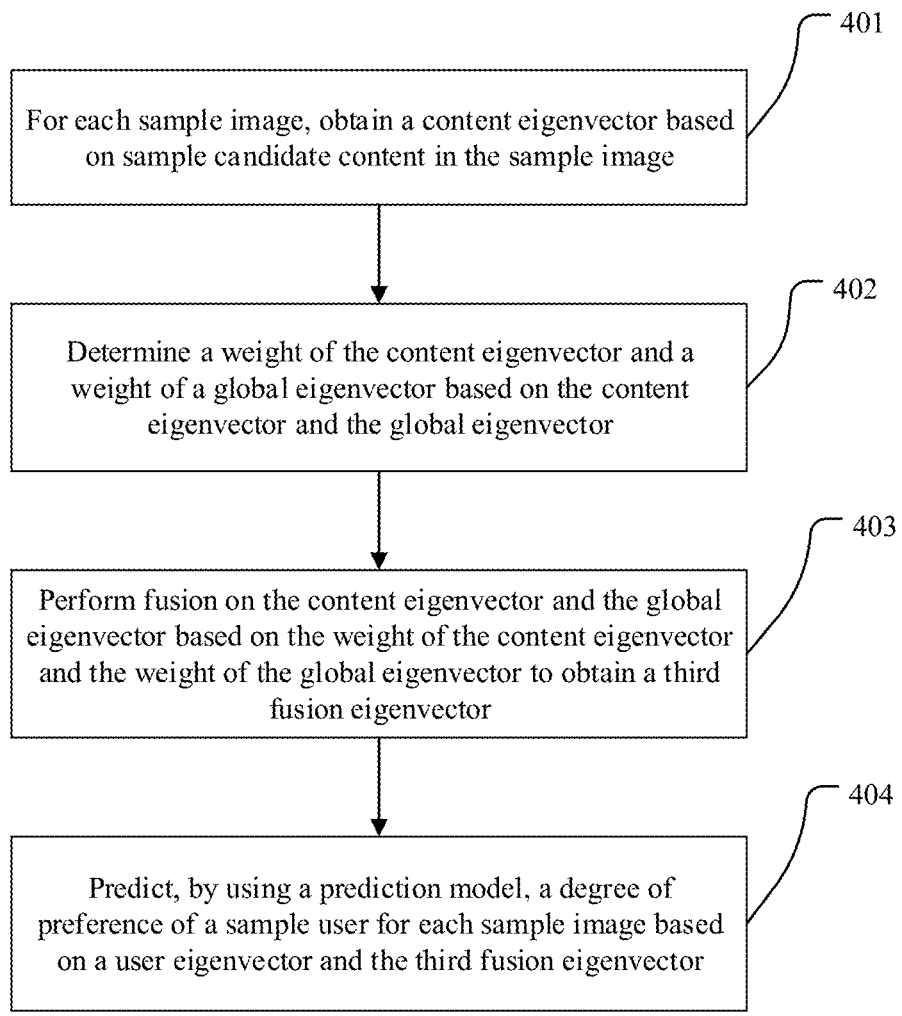
FIG. 9 is a schematic diagram of a third embodiment of predicting a degree of preference of a sample user for each sample image according to an embodiment of this application.

In an implementation, as shown in FIG. 9, step 104 includes the following steps.

Step 401: For each sample image, obtain a content eigenvector based on the sample candidate content in each sample image, where the content eigenvector represents the sample candidate content.

Similar to the process of obtaining the word vector, the sample candidate content may also be converted into the content eigenvector by using a text characterizer.

It can be understood that, when the sample candidate content is news content, a title of the news content usually can well indicate main information of the news content. Therefore, when the sample candidate content is news content, the title of the news content may be converted into a title eigenvector, and the title eigenvector is used as a content eigenvector representing the sample candidate content.

Step 402: Determine a weight of the content eigenvector and a weight of the global eigenvector based on the content eigenvector and the global eigenvector.

It should be noted that there are a plurality of methods for determining the weight of the content eigenvector and the weight of the global eigenvector. This is not specifically limited in this embodiment of this application.

A user may have different sensitivity to visual impression information and text semantics. Therefore, in an implementation, the weight of the content eigenvector and the weight of the global eigenvector may be adaptively controlled by using a threshold addition network.

Specifically, a process of controlling the weight of the content eigenvector and the weight of the global eigenvector by using the threshold addition network includes: calculating the weight of the content eigenvector by using the following formula: $a=\sigma(g(o^*, e2))$, where the weight of the global eigenvector is $(1-a)$, $g(\bullet)$ indicates a linear transformation, $\sigma$ indicates a sigmoid function, $e2$ indicates the content eigenvector, and $o^*$ indicates the global eigenvector. It can be learned from the formula that a is determined by both $e2$ and $o^*$, and may be adaptively adjusted.

Step 403: Perform fusion on the content eigenvector and the global eigenvector based on the weight of the content eigenvector and the weight of the global eigenvector to obtain a third fusion eigenvector.

The foregoing process may be implemented by using the following formula: $e^*=a*e2+(1-a)*o^*$.

Figure 10:
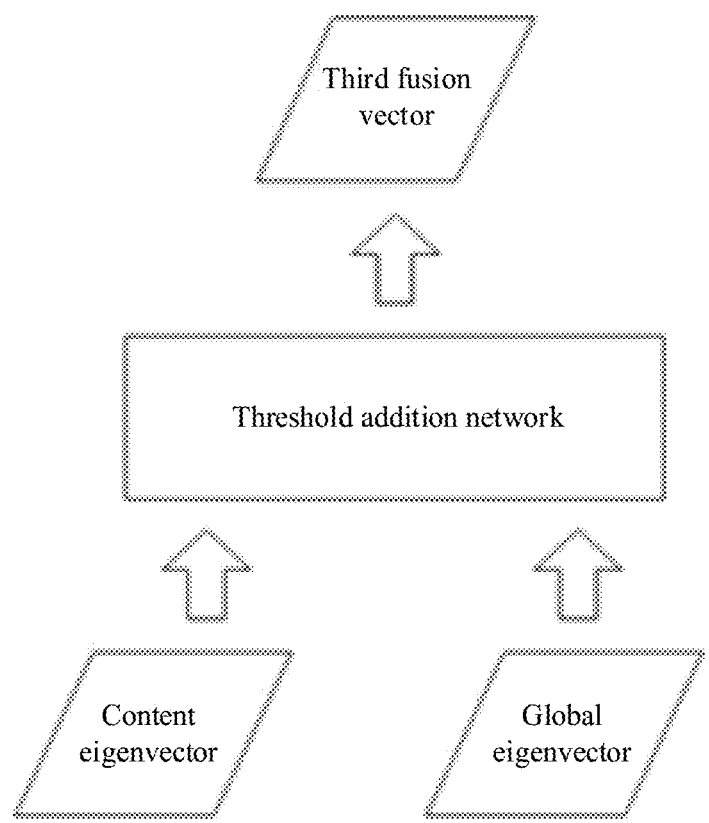
FIG. 10 is a schematic diagram of a process of obtaining a third fusion eigenvector according to an embodiment of this application.

Based on the foregoing descriptions, it can be learned that, as shown in FIG. 10, a process of obtaining the third fusion eigenvector may be summarized as follows: The content eigenvector and the global eigenvector are used as input and are processed by using the threshold addition network to output the third fusion eigenvector.

Step 404: Predict, by using the prediction model, the degree of preference of the sample user for each sample image based on the user eigenvector and the third fusion eigenvector, where input for the prediction model is determined based on the user eigenvector and the third fusion vector, and the user eigenvector represents the user feature data of the sample user.

In this embodiment, the user eigenvector and the third fusion eigenvector may be directly input to the prediction model, to predict the degree of preference for each sample image.

The following describes a recommendation method provided in embodiments of this application.

Figure 11:
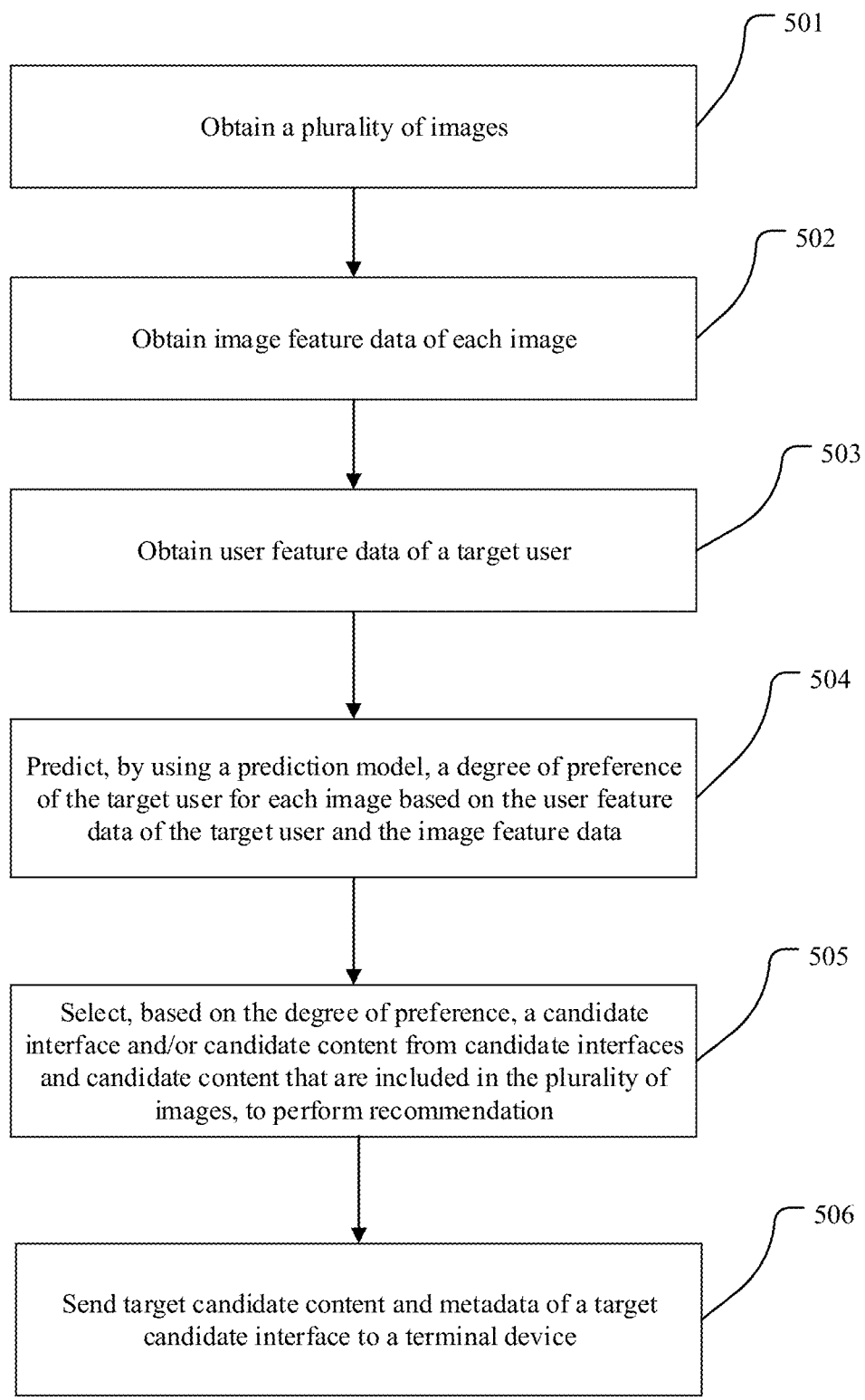
FIG. 11 is a schematic diagram of an embodiment of a recommendation method according to an embodiment of this application.

As shown in FIG. 11, an embodiment of this application provides an embodiment of a recommendation method. The embodiment may be applied to a server or a terminal. Specifically, this embodiment includes the following steps.

Step 501: Obtain a plurality of images, where each image includes one candidate interface and one type of candidate content presented by using the candidate interface.

Step 502: Obtain image feature data of each image.

In an implementation, each image includes a plurality of regions. Correspondingly, the image feature data of each image includes a plurality of local eigenvectors, and each local eigenvector represents one region.

In an implementation, the image feature data of each image includes a global eigenvector, and the global eigenvector represents the image.

Step 503: Obtain user feature data of a target user.

Step 504: Predict, by using a prediction model, a degree of preference of the target user for each image based on the user feature data of the target user and the image feature data, where input for the prediction model is determined based on the user feature data and the image feature data.

Figure 12:
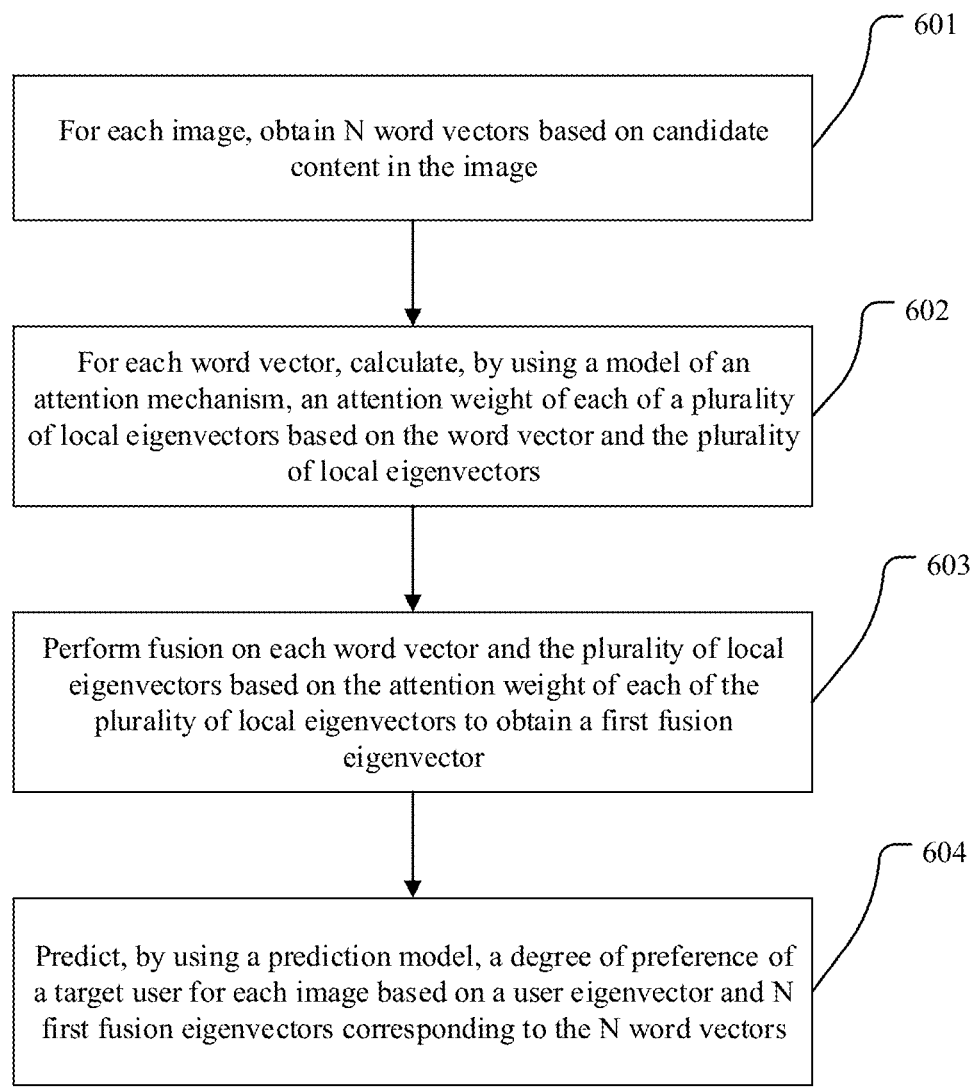
FIG. 12 is a schematic diagram of a first embodiment of predicting a degree of preference of a target user for each image according to an embodiment of this application.

In an implementation, as shown in FIG. 12, when the image feature data of each image includes a plurality of local eigenvectors, step 504 includes the following steps.

Step 601: For each image, obtain N word vectors based on the candidate content in the image, where each word vector represents one word in the candidate content, and N is a positive integer.

Step 602: For each word vector, calculate, by using a model of an attention mechanism, an attention weight of each of the plurality of local eigenvectors based on the word vector and the plurality of local eigenvectors, where the attention weight indicates a degree to which the target user pays attention to a region represented by the local eigenvector when the target user reads a word represented by each word vector.

Step 603: Perform fusion on each word vector and the plurality of local eigenvectors based on the attention weight of each of the plurality of local eigenvectors to obtain a first fusion eigenvector, where one first fusion eigenvector is correspondingly obtained for each word vector.

Step 604: Predict, by using the prediction model, the degree of preference of the target user for each image based on the user eigenvector and N first fusion eigenvectors corresponding to the N word vectors, where input for the prediction model is determined based on the user eigenvector and the N first fusion eigenvectors, and the user eigenvector represents the user feature data of the target user.

Figure 13:
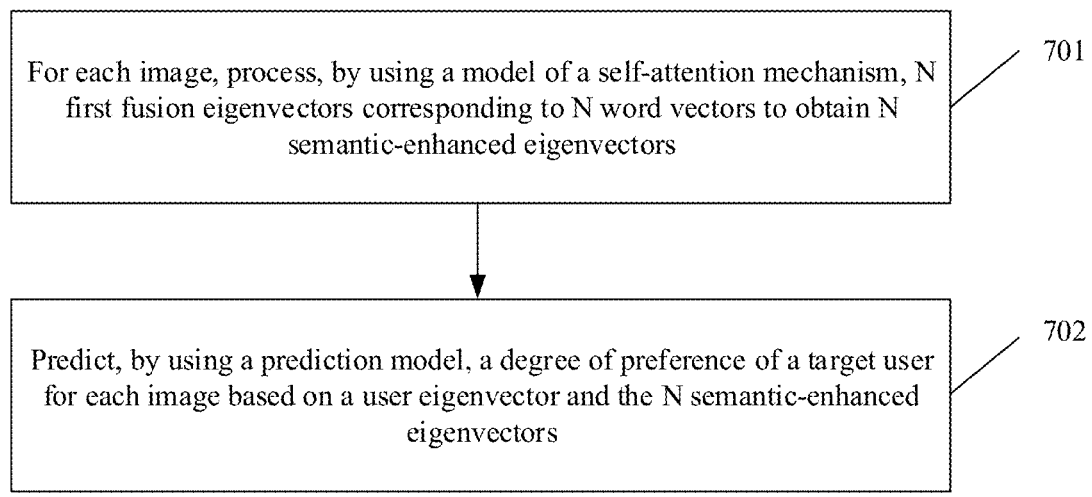
FIG. 13 is a schematic diagram of a second embodiment of predicting a degree of preference of a target user for each image according to an embodiment of this application.

In an implementation, as shown in FIG. 13, step 604 includes the following steps.

Step 701: For each image, process, by using a model of a self-attention mechanism, the N first fusion eigenvectors corresponding to the N word vectors to obtain N semantic-enhanced eigenvectors, where each first fusion eigenvector corresponds to one semantic-enhanced eigenvector.

Step 702: Predict, by using the prediction model, the degree of preference of the target user for each image based on the user eigenvector and the N semantic-enhanced eigenvectors, where input for the prediction model is determined based on the user eigenvector and the N semantic-enhanced eigenvectors.

In an implementation, step 702 includes:

for each image, performing fusion on the N semantic-enhanced eigenvectors by using a model of an additive attention mechanism to obtain a second fusion eigenvector; and predicting, by using the prediction model, the degree of preference of the target user for each image based on the user eigenvector and the second fusion eigenvector, where input for the prediction model is determined based on the user eigenvector and the second fusion eigenvector.

Figure 14:
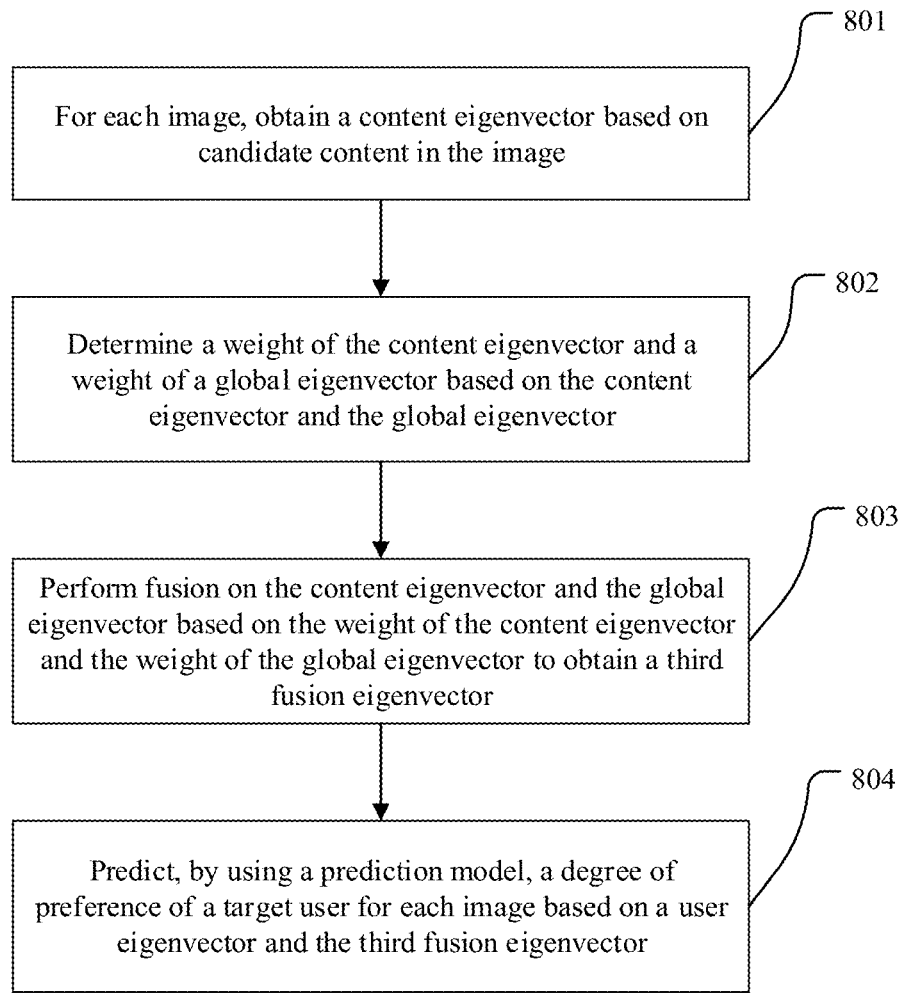
FIG. 14 is a schematic diagram of a third embodiment of predicting a degree of preference of a target user for each image according to an embodiment of this application.

In an implementation, as shown in FIG. 14, when the image feature data of each image includes the global eigenvector, step 504 includes the following steps.

Step 801: For each image, obtain a content eigenvector based on the candidate content in the image, where the content eigenvector represents the candidate content.

Step 802: Determine a weight of the content eigenvector and a weight of the global eigenvector based on the content eigenvector and the global eigenvector.

Step 803: Perform fusion on the content eigenvector and the global eigenvector based on the weight of the content eigenvector and the weight of the global eigenvector to obtain a third fusion eigenvector.

Step 804: Predict, by using the prediction model, the degree of preference of the target user for each image based on the user eigenvector and the third fusion eigenvector, where input for the prediction model is determined based on the user eigenvector and the third fusion vector, and the user eigenvector represents the user feature data of the target user.

In an implementation, step 804 includes:
selecting, based on the degree of preference, a type of candidate content from the candidate content included in the plurality of images as target candidate content; and
selecting, based on the degree of preference, a candidate interface from candidate interfaces of images that include the target candidate content as a target candidate interface, to recommend the target candidate content by using the target candidate interface.

It should be noted that step 501 to step 504 are similar to step 101 to step 104. For details, refer to related descriptions of step 101 and step 103 for understanding.

Step 505: Select, based on the degree of preference, a candidate interface and/or candidate content from candidate interfaces and candidate content that are included in the plurality of images, to perform recommendation.

It should be noted that, based on the degree of preference, only candidate content may be selected from the plurality of images for recommendation, or only a candidate interface may be selected from the plurality of images for recommendation, or both candidate content and a candidate interface may be selected from the plurality of images for recommendation. This is described in detail below.

Figure 15:
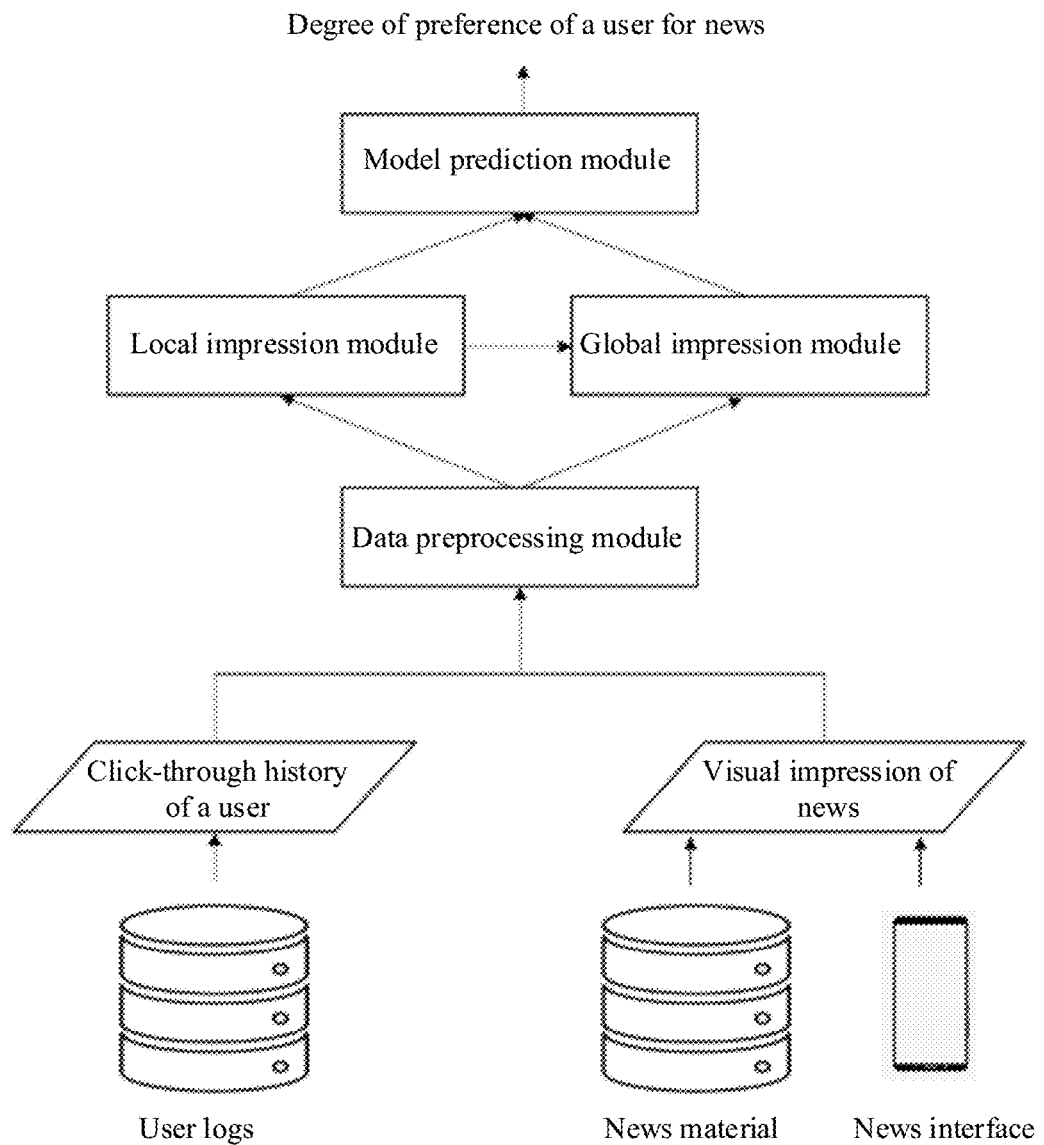
FIG. 15 is a schematic diagram of an embodiment of predicting a degree of preference of a user for news according to an embodiment of this application.

For example, as shown in FIG. 15, a click-through history of a user is obtained from user logs, and a visual impression of news is obtained based on a news material and a news interface. Then a degree of preference of the user for the news is obtained through processing by a data preprocessing module, a local impression module, a global impression module, and a model prediction module, where the degree of preference is specifically a degree of preference of the user for news content (namely, candidate content). Finally, a plurality of images are sorted in descending order of degrees of preference, and then news content of M images ranked top is selected and recommended to a target user.

The data preprocessing module is configured to perform step 502 and step 503. The local impression module is configured to perform the fusion operation in step 603, step 701, and step 702 to obtain the second fusion eigenvector. The global impression module is configured to perform step 802 and step 803. The model prediction module is configured to perform the prediction operation in step 702 and the prediction operation in step 804.

Figure 16:
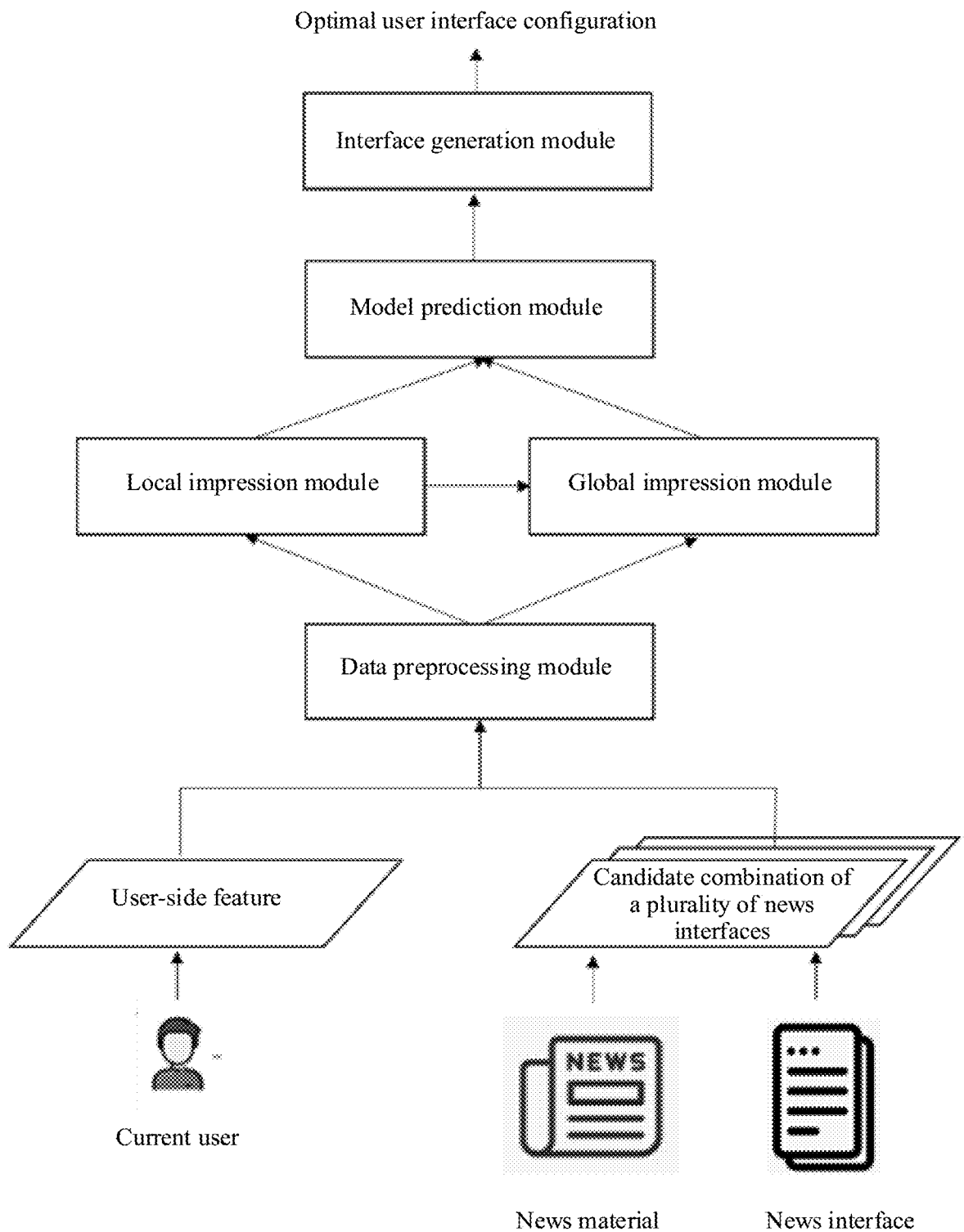
FIG. 16 is a schematic diagram of an embodiment of obtaining an optimal user interface configuration according to an embodiment of this application.

For another example, as shown in FIG. 16, a user-side feature (namely, user feature data) of a current user is obtained, and a candidate combination of a plurality of news interfaces (namely, the plurality of images in the foregoing descriptions) is obtained based on a news material and a news interface. Then a degree of preference of the user for news is obtained through processing by a data preprocessing module, a local impression module, a global impression module, a model prediction module, and an interface generation module, where the degree of preference is specifically a degree of preference of the user for a user interface (namely, a candidate interface) in an image. Finally, a plurality of images are sorted in descending order of degrees of preference, and then a user interface (namely, an optimal user interface) in an image with a highest degree of preference is selected, and then an optimal user interface configuration is generated. Then the optimal user interface may be displayed based on the optimal user interface configuration, and various types of content are recommended to the current user by using the optimal user interface.

The data preprocessing module is configured to perform step 502 and step 503. The local impression module is configured to perform the fusion operation in step 603, step 701, and step 702 to obtain the second fusion eigenvector. The global impression module is configured to perform step 802 and step 803. The model prediction module is configured to perform the prediction operation in step 702 and the prediction operation in step 804. The interface generation module is configured to generate an optimal user interface based on a result of prediction performed by the model prediction module.

In addition, in an implementation, step 505 includes:
selecting, based on the degree of preference, a type of candidate content from the candidate content included in the plurality of images as target candidate content; and
selecting, based on the degree of preference, a candidate interface from candidate interfaces of images that include the target candidate content as a target candidate interface, to recommend the target candidate content by using the target candidate interface.

It should be noted that a plurality of types of candidate content may be selected based on the degree of preference for recommendation to the target user, and the target candidate content is one of the selected plurality of types of candidate content.

The following describes the foregoing process by using a specific example.

For example, there are four images, a first image includes candidate content A and a candidate interface A, a second image includes the candidate content A and a candidate interface B, a third image includes candidate content B and the candidate interface A, a fourth image includes the candidate content B and the candidate interface B, and the four images are sorted in descending order of degrees of preference of a target user as follows: the first image, the second image, the fourth image, and the third image.

If target candidate content is the candidate content A, because the first image and the second image include the candidate content A, a target candidate interface is selected from the candidate interfaces of the first image and the second image. Further, because a degree of preference of the target user for the first image is higher than a degree of preference of the target user for the second image, the candidate interface A in the first image is selected as the target candidate interface. Then the candidate content A is recommended to the target user by using the candidate interface A.

Similarly, if target candidate content is the candidate content B, because the third image and the fourth image include the candidate content B, a target candidate interface is selected from the candidate interfaces of the fourth image and the third image. Further, because a degree of preference of the target user for the fourth image is higher than a degree of preference of the target user for the third image, the candidate interface B in the fourth image is selected as the target candidate interface. Then the candidate content B is recommended to the target user by using the candidate interface B.

It can be learned that different target candidate interfaces may be obtained for different target candidate content.

Step 506: Send the target candidate content and metadata of the target candidate interface to a terminal device, so that the terminal device displays the target candidate interface based on the metadata, and recommends the target candidate content to the target user by using the target candidate interface.

It can be understood that, when the foregoing method is performed by a server, the server sends the target candidate content and the metadata of the target candidate interface to the terminal device. Correspondingly, the terminal device receives the target candidate content and the metadata of the target candidate interface, displays the target candidate interface based on the metadata, and recommends the target candidate content to the target user by using the target candidate interface.

Figure 17:
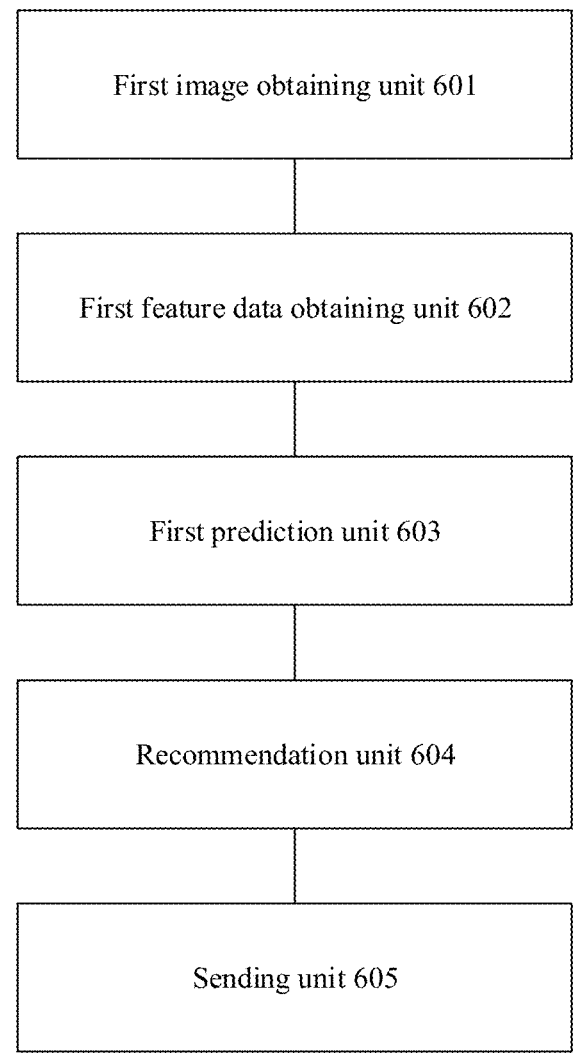
FIG. 17 is a schematic diagram of an embodiment of a training apparatus according to an embodiment of this application.

As shown in FIG. 17, an embodiment of this application provides an embodiment of a recommendation apparatus, including: a first image obtaining unit 601, configured to obtain a plurality of images, where each image includes one candidate interface and one type of candidate content presented by using the candidate interface; a first feature data obtaining unit 602, configured to obtain image feature data of each image; a first prediction unit 603, configured to predict, by using a prediction model, a degree of preference of a target user for each image based on user feature data of the target user and the image feature data, where input for the prediction model is determined based on the user feature data and the image feature data; and a recommendation unit 604, configured to select, based on the degree of preference, a candidate interface and/or candidate content from candidate interfaces and candidate content that are included in the plurality of images, to perform recommendation.

In an implementation, each image includes a plurality of regions, the image feature data of each image includes a plurality of local eigenvectors, and each local eigenvector represents one region.

In an implementation, the first prediction unit 603 is configured to: for each image, obtain N word vectors based on the candidate content in the image, where each word vector represents one word in the candidate content, and N is a positive integer; for each word vector, calculate, by using a model of an attention mechanism, an attention weight of each of the plurality of local eigenvectors based on the word vector and the plurality of local eigenvectors, where the attention weight indicates a degree to which the target user pays attention to a region represented by the local eigenvector when the target user reads a word represented by each word vector; perform fusion on each word vector and the plurality of local eigenvectors based on the attention weight of each of the plurality of local eigenvectors to obtain a first fusion eigenvector, where one first fusion eigenvector is correspondingly obtained for each word vector; and predict, by using the prediction model, the degree of preference of the target user for each image based on the user eigenvector and N first fusion eigenvectors corresponding to the N word vectors, where input for the prediction model is determined based on the user eigenvector and the N first fusion eigenvectors, and the user eigenvector represents the user feature data of the target user.

In an implementation, the first prediction unit 603 is configured to: for each image, process, by using a model of a self-attention mechanism, the N first fusion eigenvectors corresponding to the N word vectors to obtain N semantic-enhanced eigenvectors, where each first fusion eigenvector corresponds to one semantic-enhanced eigenvector; and predict, by using the prediction model, the degree of preference of the target user for each image based on the user eigenvector and the N semantic-enhanced eigenvectors, where input for the prediction model is determined based on the user eigenvector and the N semantic-enhanced eigenvectors.

In an implementation, that the first prediction unit 603 is configured to predict, by using the prediction model, the degree of preference of the target user for each image based on the user eigenvector and the N semantic-enhanced eigenvectors includes: for each image, performing fusion on the N semantic-enhanced eigenvectors by using a model of an additive attention mechanism to obtain a second fusion eigenvector; and predicting, by using the prediction model, the degree of preference of the target user for each image based on the user eigenvector and the second fusion eigenvector, where input for the prediction model is determined based on the user eigenvector and the second fusion eigenvector.

In an implementation, the image feature data of each image includes a global eigenvector, and the global eigenvector represents the image.

In an implementation, the first prediction unit 603 is configured to: for each image, obtain a content eigenvector based on the candidate content in the image, where the content eigenvector represents the candidate content; determine a weight of the content eigenvector and a weight of the global eigenvector based on the content eigenvector and the global eigenvector; perform fusion on the content eigenvector and the global eigenvector based on the weight of the content eigenvector and the weight of the global eigenvector to obtain a third fusion eigenvector; and predict, by using the prediction model, the degree of preference of the target user for each image based on the user eigenvector and the third fusion eigenvector, where input for the prediction model is determined based on the user eigenvector and the third fusion vector, and the user eigenvector represents the user feature data of the target user.

In an implementation, the recommendation unit 604 is configured to: select, based on the degree of preference, a type of candidate content from the candidate content included in the plurality of images as target candidate content; and select, based on the degree of preference, a candidate interface from candidate interfaces of images that include the target candidate content as a target candidate interface, to recommend the target candidate content by using the target candidate interface.

In an implementation, the apparatus further includes a sending unit 605, configured to send the target candidate content and metadata of the target candidate interface to a terminal device, so that the terminal device displays the target candidate interface based on the metadata, and recommends the target candidate content to the target user by using the target candidate interface.

For specific implementations, related descriptions, and technical effect of the foregoing units, refer to the descriptions in the method part of embodiments of this application.

Figure 18:
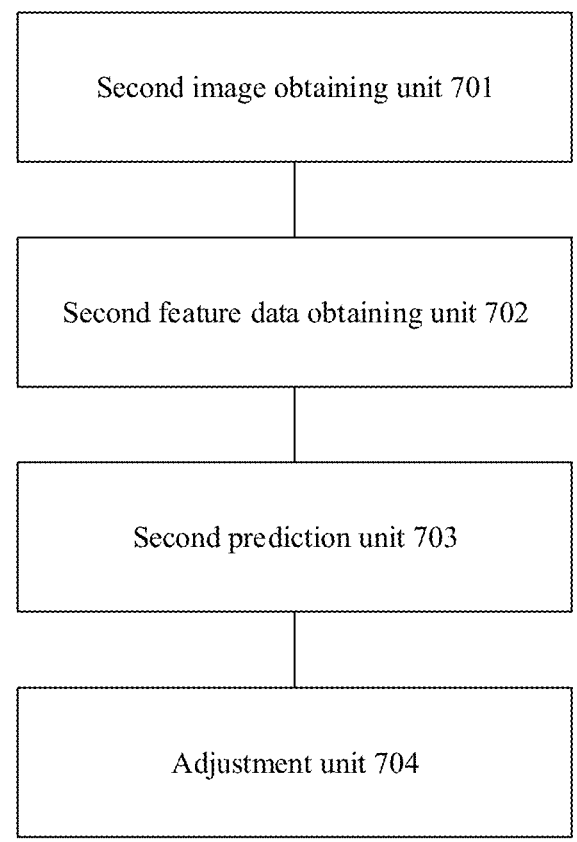
FIG. 18 is a schematic diagram of an embodiment of a recommendation apparatus according to an embodiment of this application.

As shown in FIG. 18, an embodiment of this application provides an embodiment of a training apparatus, including: a second image obtaining unit 701, configured to obtain a plurality of sample images, where each sample image includes one sample candidate interface and one type of sample candidate content presented by using the sample candidate interface; a second feature data obtaining unit 702, configured to obtain image feature data of each sample image; a second prediction unit 703, configured to predict, by using a prediction model, a degree of preference of a sample user for each sample image based on user feature data of the sample user and the image feature data, where input for the prediction model is determined based on the user feature data and the image feature data; and an adjustment unit 704, configured to adjust the prediction model based on the degree of preference and historical click-through data of the sample user for the sample candidate content.

In an implementation, each sample image includes a plurality of regions, the image feature data of each sample image includes a plurality of local eigenvectors, and each local eigenvector represents one region.

In an implementation, the second prediction unit 703 is configured to: for each sample image, obtain N word vectors based on the sample candidate content in each sample image, where each word vector represents one word in the sample candidate content, and N is a positive integer; for each word vector, calculate, by using a model of an attention mechanism, an attention weight of each of the plurality of local eigenvectors based on the word vector and the plurality of local eigenvectors, where the attention weight indicates a degree to which the sample user pays attention to a region represented by the local eigenvector when the sample user reads a word represented by each word vector; perform fusion on each word vector and the plurality of local eigenvectors based on the attention weight of each of the plurality of local eigenvectors to obtain a first fusion eigenvector, where one first fusion eigenvector is correspondingly obtained for each word vector; and predict, by using the prediction model, the degree of preference of the sample user for each sample image based on the user eigenvector and N first fusion eigenvectors corresponding to the N word vectors, where input for the prediction model is determined based on the user eigenvector and the N first fusion eigenvectors, and the user eigenvector represents the user feature data of the sample user.

In an implementation, the second prediction unit 703 is configured to: for each sample image, process, by using a model of a self-attention mechanism, the N first fusion eigenvectors corresponding to the N word vectors to obtain N semantic-enhanced eigenvectors, where each first fusion eigenvector corresponds to one semantic-enhanced eigenvector; and predict, by using the prediction model, the degree of preference of the sample user for each sample image based on the user eigenvector and the N semantic-enhanced eigenvectors, where input for the prediction model is determined based on the user eigenvector and the N semantic-enhanced eigenvectors.

In an implementation, the second prediction unit 703 is configured to: for each sample image, perform fusion on the N semantic-enhanced eigenvectors by using a model of an additive attention mechanism to obtain a second fusion eigenvector; and predict, by using the prediction model, the degree of preference of the sample user for each sample image based on the user eigenvector and the second fusion eigenvector, where input for the prediction model is determined based on the user eigenvector and the second fusion eigenvector.

In an implementation, the image feature data of each sample image includes a global eigenvector, and the global eigenvector represents the sample image.

In an implementation, the second prediction unit 703 is configured to: for each sample image, obtain a content eigenvector based on the sample candidate content in each sample image, where the content eigenvector represents the sample candidate content; determine a weight of the content eigenvector and a weight of the global eigenvector based on the content eigenvector and the global eigenvector; perform fusion on the content eigenvector and the global eigenvector based on the weight of the content eigenvector and the weight of the global eigenvector to obtain a third fusion eigenvector; and predict, by using the prediction model, the degree of preference of the sample user for each sample image based on the user eigenvector and the third fusion eigenvector, where input for the prediction model is determined based on the user eigenvector and the third fusion vector, and the user eigenvector represents the user feature data of the sample user.

For specific implementations, related descriptions, and technical effect of the foregoing units, refer to the descriptions in the method part of embodiments of this application.

An embodiment of this application further provides an embodiment of a computer device. The computer device may be a terminal or a server. When the computer device is a server, the computer device may serve as a training device.

Figure 19:
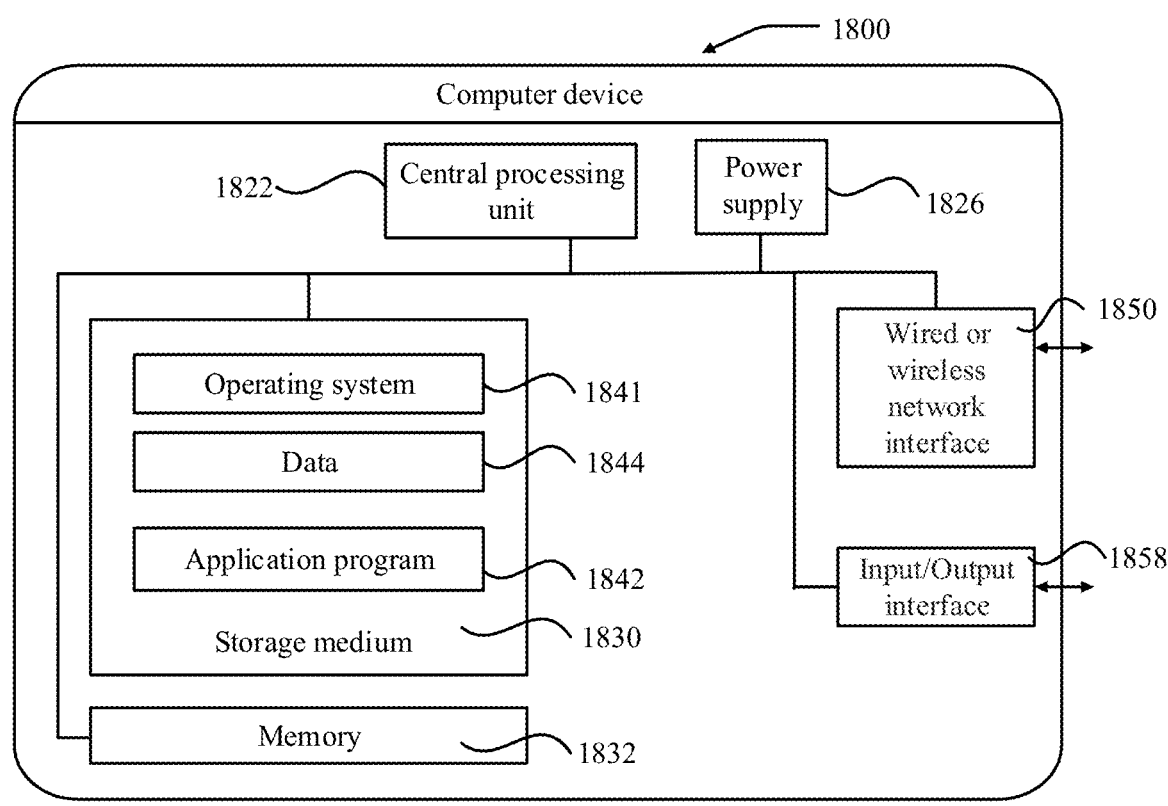
FIG. 19 is a schematic diagram of an embodiment of a computer device according to an embodiment of this application.

FIG. 19 is a schematic diagram of a structure of a computer device according to an embodiment of this application. The computer device is configured to implement the functions of the recommendation apparatus in the embodiment corresponding to FIG. 17 or the functions of the training apparatus in the embodiment corresponding to FIG. 18. Specifically, the computer device 1800 is implemented by using one or more servers. The computer device 1800 may vary greatly due to different configurations or performance, and may include one or more central processing units (central processing units, CPU) 1822 (for example, one or more processors), a memory 1832, and one or more storage media 1830 (for example, one or more mass storage devices) for storing an application program 1842 or data 1844. The memory 1832 and the storage medium 1830 may be transitory storage or persistent storage. The program stored in the storage medium 1830 may include one or more modules (not shown in the figure), and each module may include a series of instruction operations for the computer device. Further, the central processing unit 1822 may be configured to communicate with the storage medium 1830, and perform, on the computer device 1800, a series of instruction operations in the storage medium 1830.

The computer device 1800 may further include one or more power supplies 1826, one or more wired or wireless network interfaces 1850, one or more input/output interfaces 1858, and/or one or more operating systems 1841, for example, Windows Server™, Mac OS X™, Unix™, Linux™, or FreeBSD™.

In this embodiment of this application, the central processing unit 1822 may be configured to perform a search method performed by the recommendation apparatus in the embodiment corresponding to FIG. 17. Specifically, the central processing unit 1822 may be configured to:

obtain a plurality of images, where each image includes one candidate interface and one type of candidate content presented by using the candidate interface;

obtain image feature data of each image;
predict, by using a prediction model, a degree of preference of a target user for each image based on user feature data of the target user and the image feature data, where input for the prediction model is determined based on the user feature data and the image feature data; and
select, based on the degree of preference, a candidate interface and/or candidate content from candidate interfaces and candidate content that are included in the plurality of images, to perform recommendation.

In this embodiment of this application, the central processing unit 1822 may be configured to perform the model training method performed by the training apparatus in the embodiment corresponding to FIG. 18. Specifically, the central processing unit 1822 may be configured to:

obtain a plurality of sample images, where each sample image includes one sample candidate interface and one type of sample candidate content presented by using the sample candidate interface;
obtain image feature data of each sample image;
predict, by using a prediction model, a degree of preference of a sample user for each sample image based on user feature data of the sample user and the image feature data, where input for the prediction model is determined based on the user feature data and the image feature data; and
adjust the prediction model based on the degree of preference and historical click-through data of the sample user for the sample candidate content.

An embodiment of this application further provides a chip, including one or more processors. Some or all of the processors are configured to read and execute a computer program stored in a memory, to perform the methods in the foregoing embodiments.

Optionally, the chip includes the memory, and the memory and the processor are connected to the memory through a circuit or a wire. Further, optionally, the chip further includes a communication interface, and the processor is connected to the communication interface. The communication interface is configured to receive data and/or information that need to be processed. The processor obtains the data and/or the information from the communication interface, processes the data and/or the information, and outputs a processing result through the communication interface. The communication interface may be an input/output interface.

In some implementations, some of the one or more processors may alternatively implement some steps of the foregoing methods by using dedicated hardware. For example, processing related to a neural network model may be implemented by a dedicated neural network processor or graphics processing unit.

The methods provided in embodiments of this application may be implemented by one chip, or may be implemented by a plurality of chips through collaboration.

An embodiment of this application further provides a computer storage medium. The computer storage medium is configured to store computer software instructions to be used by the foregoing computer device, and the computer software instructions include a program designed for execution by the computer device.

The computer device may be the recommendation apparatus in the embodiment corresponding to FIG. 17 or the training apparatus in the embodiment corresponding to FIG. 18.

An embodiment of this application further provides a computer program product. The computer program product includes computer software instructions. The computer software instructions may be loaded by a processor to implement the processes in the methods shown in the foregoing embodiments.

It can be clearly understood by a person skilled in the art that, for ease and brevity of description, for detailed operating processes of the foregoing system, apparatus, and unit, reference may be made to corresponding processes in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some feature data may be ignored or not executed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A method, comprising:
   obtaining a plurality of images, wherein each image comprises one candidate interface and one type of candidate content presented by using the candidate interface, and each image comprises a plurality of regions;

obtaining image feature data of each image, wherein the image feature data of each image comprises a plurality of local eigenvectors that correspond to the plurality of regions respectively;

predicting, by using a prediction model, a degree of preference of a target user for each image based on user feature data of the target user and the image feature data, wherein input for the prediction model is determined based on the user feature data and the image feature data; and selecting, based on the degree of preference, at least one of a candidate interface or candidate content from candidate interfaces and candidate content that are comprised in the plurality of images, to perform recommendation.

2. The method according to claim 1, wherein;

the predicting, by using a prediction model, a degree of preference of a target user for each image based on user feature data of the target user and the image feature data comprises:

for each image, obtaining N word vectors based on candidate content in the image, wherein each word vector represents one word in the candidate content, and N is a positive integer;

for each word vector, calculating, by using a model of an attention mechanism, an attention weight of each of the plurality of local eigenvectors based on the word vector and the plurality of local eigenvectors, wherein the attention weight indicates a degree to which the target user pays attention to a region represented by a respective local eigenvector when the target user reads a word represented by each word vector;

performing fusion on each word vector and the plurality of local eigenvectors based on the attention weight of each of the plurality of local eigenvectors to obtain a first fusion eigenvector, wherein one first fusion eigenvector is correspondingly obtained for each word vector; and predicting, by using the prediction model, the degree of preference of the target user for each image based on a user eigenvector and N first fusion eigenvectors corresponding to the N word vectors, wherein input for the prediction model is determined based on the user eigenvector and the N first fusion eigenvectors, and the user eigenvector represents the user feature data of the target user.

3. The method according to claim 2, wherein the predicting, by using the prediction model, the degree of preference of the target user for each image based on the user eigenvector and N first fusion eigenvectors corresponding to the N word vectors comprises:

for each image, processing, by using a model of a self-attention mechanism, the N first fusion eigenvectors corresponding to the N word vectors to obtain N semantic-enhanced eigenvectors, wherein each first fusion eigenvector corresponds to one semantic-enhanced eigenvector; and predicting, by using the prediction model, the degree of preference of the target user for each image based on the user eigenvector and the N semantic-enhanced eigenvectors, wherein input for the prediction model is determined based on the user eigenvector and the N semantic-enhanced eigenvectors.

4. The method according to claim 3, wherein the predicting, by using the prediction model, the degree of preference of the target user for each image based on the user eigenvector and the N semantic-enhanced eigenvectors comprises:

for each image, performing fusion on the N semantic-enhanced eigenvectors by using a model of an additive attention mechanism to obtain a second fusion eigenvector; and predicting, by using the prediction model, the degree of preference of the target user for each image based on the user eigenvector and the second fusion eigenvector, wherein input for the prediction model is determined based on the user eigenvector and the second fusion eigenvector.

5. The method according to claim 1, wherein the image feature data of each image comprises a global eigenvector, and the global eigenvector represents the image.

6. The method according to claim 5, wherein the predicting, by using a prediction model, a degree of preference of a target user for each image based on user feature data of the target user and the image feature data comprises:

for each image, obtaining a content eigenvector based on the candidate content in the image, wherein the content eigenvector represents the candidate content;

determining a weight of the content eigenvector and a weight of the global eigenvector based on the content eigenvector and the global eigenvector;

performing fusion on the content eigenvector and the global eigenvector based on the weight of the content eigenvector and the weight of the global eigenvector to obtain a third fusion eigenvector; and predicting, by using the prediction model, the degree of preference of the target user for each image based on a user eigenvector and the third fusion eigenvector, wherein input for the prediction model is determined based on the user eigenvector and a third fusion vector, and the user eigenvector represents the user feature data of the target user.

7. The method according to claim 1, wherein the selecting, based on the degree of preference, at least one of a candidate interface or candidate content from candidate interfaces and candidate content that are comprised in the plurality of images, to perform recommendation comprises:

selecting, based on the degree of preference, a type of candidate content from the candidate content comprised in the plurality of images as target candidate content; and selecting, based on the degree of preference, a candidate interface from candidate interfaces of images that comprise the target candidate content as a target candidate interface, to recommend the target candidate content by using the target candidate interface.

8. The method according to claim 7, wherein after the selecting, based on the degree of preference, a candidate interface from candidate interfaces of images that comprise the target candidate content as a target candidate interface, the method further comprises:

sending the target candidate content and metadata of the target candidate interface to a terminal device, wherein the terminal device displays the target candidate interface based on the metadata, and recommends the target candidate content to the target user by using the target candidate interface.

9. A method, comprising:

obtaining a plurality of sample images, wherein each sample image comprises one sample candidate interface and one type of sample candidate content presented by using the sample candidate interface, and each sample image comprises a plurality of regions;

obtaining image feature data of each sample image, wherein the image feature data of each sample image comprises a plurality of local eigenvectors that correspond to the plurality of regions respectively;

predicting, by using a prediction model, a degree of preference of a sample user for each sample image based on user feature data of the sample user and the image feature data, wherein input for the prediction model is determined based on the user feature data and the image feature data; and adjusting the prediction model based on the degree of preference and historical click-through data of the sample user for the sample candidate content.

10. The method according to claim 9, wherein;

the predicting, by using a prediction model, a degree of preference of a sample user for each sample image based on user feature data of the sample user and the image feature data comprises:

for each sample image, obtaining N word vectors based on the sample candidate content in each sample image, wherein each word vector represents one word in the sample candidate content, and N is a positive integer;

for each word vector, calculating, by using a model of an attention mechanism, an attention weight of each of the plurality of local eigenvectors based on the word vector and the plurality of local eigenvectors, wherein the attention weight indicates a degree to which the sample user pays attention to a region represented by a respective local eigenvector when the sample user reads a word represented by each word vector;

performing fusion on each word vector and the plurality of local eigenvectors based on the attention weight of each of the plurality of local eigenvectors to obtain a first fusion eigenvector, wherein one first fusion eigenvector is correspondingly obtained for each word vector; and predicting, by using the prediction model, the degree of preference of the sample user for each sample image based on user eigenvector and N first fusion eigenvectors corresponding to the N word vectors, wherein input for the prediction model is determined based on the user eigenvector and the N first fusion eigenvectors, and the user eigenvector represents the user feature data of the sample user.

11. The method according to claim 10, wherein the predicting, by using the prediction model, the degree of preference of the sample user for each sample image based on the user eigenvector and N first fusion eigenvectors corresponding to the N word vectors comprises:

for each sample image, processing, by using a model of a self-attention mechanism, the N first fusion eigenvectors corresponding to the N word vectors to obtain N semantic-enhanced eigenvectors, wherein each first fusion eigenvector corresponds to one semantic-enhanced eigenvector; and predicting, by using the prediction model, the degree of preference of the sample user for each sample image based on the user eigenvector and the N semantic-enhanced eigenvectors, wherein input for the prediction model is determined based on the user eigenvector and the N semantic-enhanced eigenvectors.

12. The method according to claim 11, wherein the predicting, by using the prediction model, the degree of preference of the sample user for each sample image based on the user eigenvector and the N semantic-enhanced eigenvectors comprises:

for each sample image, performing fusion on the N semantic-enhanced eigenvectors by using a model of an additive attention mechanism to obtain a second fusion eigenvector; and predicting, by using the prediction model, the degree of preference of the sample user for each sample image based on the user eigenvector and the second fusion eigenvector, wherein input for the prediction model is determined based on the user eigenvector and the second fusion eigenvector.

13. The method according to claim 9, wherein the image feature data of each sample image comprises a global eigenvector, and the global eigenvector represents the sample image.

14. The method according to claim 13, wherein the predicting, by using a prediction model, a degree of preference of a sample user for each sample image based on user feature data of the sample user and the image feature data comprises:

for each sample image, obtaining a content eigenvector based on the sample candidate content in each sample image, wherein the content eigenvector represents the sample candidate content;

determining a weight of the content eigenvector and a weight of the global eigenvector based on the content eigenvector and the global eigenvector;

performing fusion on the content eigenvector and the global eigenvector based on the weight of the content eigenvector and the weight of the global eigenvector to obtain a third fusion eigenvector; and predicting, by using the prediction model, the degree of preference of the sample user for each sample image based on a user eigenvector and the third fusion eigenvector, wherein input for the prediction model is determined based on the user eigenvector and a third fusion vector, and the user eigenvector represents the user feature data of the sample user.

15. A computer device, comprising one or more memories and one or more processors, wherein the one or more memories are coupled to the one or more processors and store computer-readable instructions for execution by the one or more processor to:

obtain a plurality of images, wherein each image comprises one candidate interface and one type of candidate content presented by using the candidate interface, and each image comprises a plurality of regions;

obtain image feature data of each image, wherein the image feature data of each image comprises a plurality of local eigenvectors that correspond to the plurality of regions respectively;

predict, by using a prediction model, a degree of preference of a target user for each image based on user feature data of the target user and the image feature data, wherein input for the prediction model is determined based on the user feature data and the image feature data; and select, based on the degree of preference, at least one of a candidate interface or candidate content from candidate interfaces and candidate content that are comprised in the plurality of images, to perform recommendation.

16. A device, comprising one or more memories and one or more processors, wherein the one or more memories are coupled to the one or more processors and store computer-readable instructions for execution by the one or more processor to:
    obtain a plurality of sample images, wherein each sample image comprises one sample candidate interface and one type of sample candidate content presented by using the sample candidate interface, and each sample image comprises a plurality of regions;
    obtain image feature data of each sample image, wherein the image feature data of each sample image comprises a plurality of local eigenvectors that correspond to the plurality of regions respectively;
    predict, by using a prediction model, a degree of preference of a sample user for each sample image based on user feature data of the sample user and the image feature data, wherein input for the prediction model is determined based on the user feature data and the image feature data; and
    adjust the prediction model based on the degree of preference and historical click-through data of the sample user for the sample candidate content.

17. A non-transitory computer-readable storage medium, wherein the non-transitory computer-readable storage medium stores computer-readable instructions for execution by at least one processor to:
    obtain a plurality of images, wherein each image comprises one candidate interface and one type of candidate content presented by using the candidate interface, and each image comprises a plurality of regions;
    obtain image feature data of each image, wherein the image feature data of each image comprises a plurality of local eigenvectors that correspond to the plurality of regions respectively;
    predict, by using a prediction model, a degree of preference of a target user for each image based on user feature data of the target user and the image feature data, wherein input for the prediction model is determined based on the user feature data and the image feature data; and
    select, based on the degree of preference, at least one of a candidate interface or candidate content from candidate interfaces and candidate content that are comprised in the plurality of images, to perform recommendation.

18. A recommendation system, comprising a terminal device and a server, wherein the server comprises one or more first processors and one or more first memories coupled to the one or more first processors, and the terminal device comprises one or more second processors and one or more second memories coupled to the one or more second processors; and wherein:
    the one or more first memories store programming instructions for execution by the one or more first processors to:
        obtain a plurality of images, wherein each image comprises one candidate interface and one type of candidate content presented by using the candidate interface, and each image comprises a plurality of regions;
        obtain image feature data of each image, wherein the image feature data of each image comprises a plurality of local eigenvectors that correspond to the plurality of regions respectively;
        predict, by using a prediction model, a degree of preference of a target user for each image based on user feature data of the target user and the image feature data, wherein input for the prediction model is determined based on the user feature data and the image feature data; and
        send, based on the degree of preference, target candidate content and metadata of a target candidate interface to a terminal device, wherein the terminal device displays the target candidate interface based on the metadata, and recommends the target candidate content to the target user by using the target candidate interface; and
    the one or more second memories store programming instructions for execution by the one or more second processors to:
        receive target candidate content and metadata of a target candidate interface from the server; and
        display the target candidate interface based on the metadata, and recommend the target candidate content to a target user by using the target candidate interface.

* * * * *